United States Patent
Urata et al.

(10) Patent No.: US 8,384,565 B2
(45) Date of Patent: Feb. 26, 2013

(54) EXPANDING OPERATING DEVICE AND OPERATING SYSTEM

(75) Inventors: Masahiro Urata, Kyoto (JP); Haruki Tojo, Kyoto (JP); Jumpei Wada, Kyoto (JP); Junji Takamoto, Kyoto (JP); Noboru Wakitani, Kyoto (JP); Kuniaki Itou, Kyoto (JP); Junpei Ueki, Kyoto (JP); Masato Ibuki, Kyoto (JP); Fumiyoshi Suetake, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 744 days.

(21) Appl. No.: 12/219,851

(22) Filed: Jul. 29, 2008

(65) Prior Publication Data

US 2010/0007528 A1     Jan. 14, 2010

(30) Foreign Application Priority Data

Jul. 11, 2008  (JP) ................. 2008-181419
Jul. 11, 2008  (JP) ................. 2008-181420
Jul. 11, 2008  (JP) ................. 2008-181421

(51) Int. Cl.
*H03M 11/00* (2006.01)

(52) U.S. Cl. ............. 341/20; 463/37; 463/47; 341/173; 341/176

(58) Field of Classification Search ............. 341/173, 341/176, 20–35; 463/30–38
See application file for complete search history.

(56) References Cited

U.S. PATENT DOCUMENTS

| | | |
|---|---|---|
| 1,661,058 A | 2/1928 | Theremin |
| 4,858,930 A | 8/1989 | Sato |
| 4,980,519 A | 12/1990 | Mathews |
| 5,151,181 A | 9/1992 | Glynn |
| 5,181,181 A | 1/1993 | Glynn |
| 5,339,095 A | 8/1994 | Redford |
| 5,413,535 A | 5/1995 | Reik |

(Continued)

FOREIGN PATENT DOCUMENTS

| | | |
|---|---|---|
| CN | 1601447 A | 3/2005 |
| EP | 0835676 | 4/1998 |

(Continued)

OTHER PUBLICATIONS

Paradiso et al, Musical Applications of Electric Field Sensing, Computer Music J., 21:2, pp. 69-89 (Summer 1997).

(Continued)

*Primary Examiner* — Albert Wong
*Assistant Examiner* — Franklin Balseca
(74) *Attorney, Agent, or Firm* — Nixon & Vanderhye P.C.

(57) ABSTRACT

An expanding operating device has a first connector, a second connector and a sensor. The first connector has a first shape physically and electrically connectable with a connector provided with an operating device. Thus, by connecting the first connector to the connector of the operating device, the expanding operating device can be used with the operating device as a single unit, which eventually adds the sensor to the operating device. On the other hand, the second connector has a second shape connectable with a connector with the first shape. This allows a connector conventionally connected to the connector of another operating device to be also connected with the second connector. Accordingly, if the connector of another device is connected to the second connector in a state that the first connector is connected to the connector of the operating device, the another device is eventually connected to the operating device via the expanding operating device.

28 Claims, 17 Drawing Sheets

U.S. PATENT DOCUMENTS

| | | |
|---|---|---|
| 5,453,758 A | 9/1995 | Sato |
| 5,516,105 A | 5/1996 | Eisenbrey et al. |
| 5,585,584 A | 12/1996 | Usa |
| 5,605,505 A | 2/1997 | Han |
| 5,645,277 A | 7/1997 | Cheng |
| 5,702,305 A | 12/1997 | Norman et al. |
| 5,741,182 A | 4/1998 | Lipps |
| 5,752,880 A | 5/1998 | Gabai |
| 5,806,849 A | 9/1998 | Rutkowski |
| 5,825,298 A | 10/1998 | Walter |
| 5,855,483 A | 1/1999 | Collins et al. |
| 5,875,257 A | 2/1999 | Marrin |
| 5,908,996 A | 6/1999 | Litterst et al. |
| 5,961,386 A | 10/1999 | Sawaguchi |
| 5,986,570 A | 11/1999 | Black et al. |
| 5,986,644 A | 11/1999 | Herder |
| 5,991,693 A | 11/1999 | Zalewski |
| 6,025,830 A | 2/2000 | Cohen |
| 6,057,788 A | 5/2000 | Cummings |
| 6,059,576 A | 5/2000 | Brann |
| 6,076,734 A | 6/2000 | Dougherty et al. |
| 6,085,805 A | 7/2000 | Bates |
| 6,091,342 A | 7/2000 | Janesch et al. |
| 6,104,380 A * | 8/2000 | Stork et al. .................. 345/158 |
| 6,160,540 A | 12/2000 | Fishkin |
| 6,162,123 A | 12/2000 | Woolston |
| 6,220,964 B1 | 4/2001 | Miyamoto |
| 6,222,522 B1 | 4/2001 | Mathews |
| 6,342,010 B1 | 1/2002 | Slifer |
| 6,346,047 B1 | 2/2002 | Sobota |
| 6,426,741 B1 | 7/2002 | Goldsmith |
| 6,452,494 B1 | 9/2002 | Harrison |
| 6,473,070 B2 | 10/2002 | Mishra |
| 6,545,661 B1 | 4/2003 | Goschy |
| 6,616,535 B1 | 9/2003 | Nishizaki |
| 6,634,949 B1 | 10/2003 | Briggs |
| 6,641,482 B2 | 11/2003 | Masuyama et al. |
| 6,642,837 B1 | 11/2003 | Vigoda et al. |
| 6,684,062 B1 | 1/2004 | Gosior |
| 6,761,637 B2 | 7/2004 | Weston et al. |
| 6,773,325 B1 | 8/2004 | Mawle |
| 6,797,895 B2 | 9/2004 | Lapstun |
| 6,811,491 B1 | 11/2004 | Levenberg |
| 6,956,564 B1 | 10/2005 | Williams |
| 7,081,051 B2 | 7/2006 | Himoto |
| 7,117,009 B2 | 10/2006 | Wong et al. |
| 7,145,551 B1 | 12/2006 | Bathiche et al. |
| 7,500,917 B2 | 3/2009 | Barney et al. |
| 7,627,451 B2 | 12/2009 | Vock et al. |
| 7,636,645 B1 | 12/2009 | Yen et al. |
| 7,749,089 B1 | 7/2010 | Briggs |
| 7,774,155 B2 | 8/2010 | Ikeda et al. |
| 7,811,171 B2 | 10/2010 | Ikeda et al. |
| 7,850,527 B2 | 12/2010 | Barney et al. |
| 7,896,742 B2 | 3/2011 | Weston et al. |
| 7,927,216 B2 | 4/2011 | Ikeda et al. |
| 7,931,535 B2 * | 4/2011 | Ikeda et al. ..................... 463/38 |
| 7,933,729 B2 * | 4/2011 | Fukushima et al. ............ 702/92 |
| 7,942,745 B2 | 5/2011 | Ikeda et al. |
| 2002/0058459 A1 | 5/2002 | Holt |
| 2003/0040347 A1 | 2/2003 | Roach et al. |
| 2003/0069077 A1 | 4/2003 | Korienek |
| 2008/0076566 A1 * | 3/2008 | Miyamoto ...................... 463/37 |
| 2008/0132334 A1 * | 6/2008 | Nonaka et al. .................. 463/37 |
| 2008/0223993 A1 * | 9/2008 | Spirov et al. ................. 244/23 A |
| 2009/0209346 A1 * | 8/2009 | Cheng et al. .................... 463/37 |
| 2009/0325710 A1 | 12/2009 | Filer et al. |
| 2010/0009760 A1 * | 1/2010 | Shimamura et al. ............ 463/43 |
| 2010/0009762 A1 * | 1/2010 | Takeda et al. ................... 463/47 |
| 2010/0113153 A1 | 5/2010 | Yen et al. |
| 2011/0172016 A1 * | 7/2011 | Ikeda et al. ..................... 463/37 |
| 2011/0294578 A1 * | 12/2011 | Sato ................................ 463/36 |

FOREIGN PATENT DOCUMENTS

| | | |
|---|---|---|
| JP | H6-198075 | 7/1994 |
| JP | 8-221171 | 8/1996 |
| JP | 10-277264 | 10/1998 |
| JP | 11-253656 | 9/1999 |
| JP | 2000-308756 | 11/2000 |
| JP | 2000-325653 | 11/2000 |
| JP | 2003 103051 | 4/2003 |
| JP | 2003-143436 | 5/2003 |
| JP | 2003-271302 | 9/2003 |
| TW | M333928 | 6/2008 |
| WO | 97 17670 | 5/1997 |
| WO | WO 97 17670 | 5/1997 |
| WO | WO 97/28864 | 8/1997 |
| WO | WO 00/67863 | 11/2000 |
| WO | 2006 090197 A1 | 8/2006 |
| WO | WO 2006 090197 A1 | 8/2006 |
| WO | 2008 025973 A2 | 3/2008 |
| WO | WO 2008 025973 A2 | 3/2008 |

OTHER PUBLICATIONS

Office Action in Taiwanese Patent Application dated Jul. 18, 2012.

Office Action dated Aug. 30, 2012 in commonly-assigned copending U.S. Appl. No. 12/821,558, filed Jun. 23, 2010, which applies the above-cited references to reject a claim and applies the publication of the present application to reject claims under 35 USC 102(a).

Partial European Search Report from EP Application No. 08165793.4 (Nov. 2, 2011).

* cited by examiner

FIG. 2
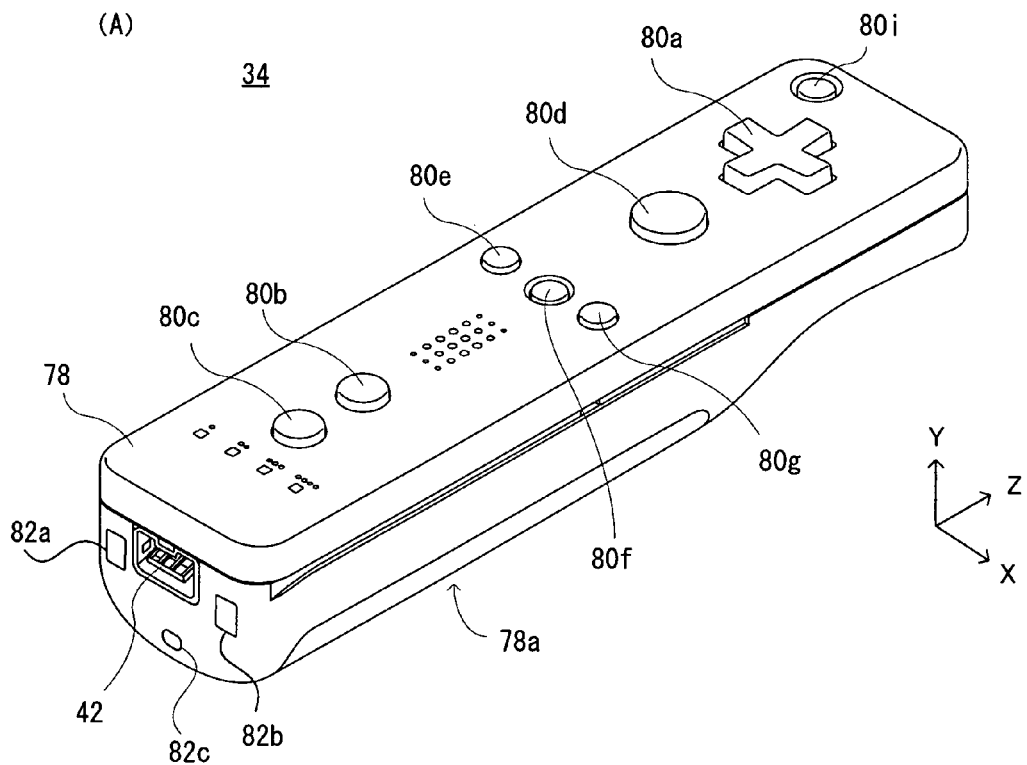
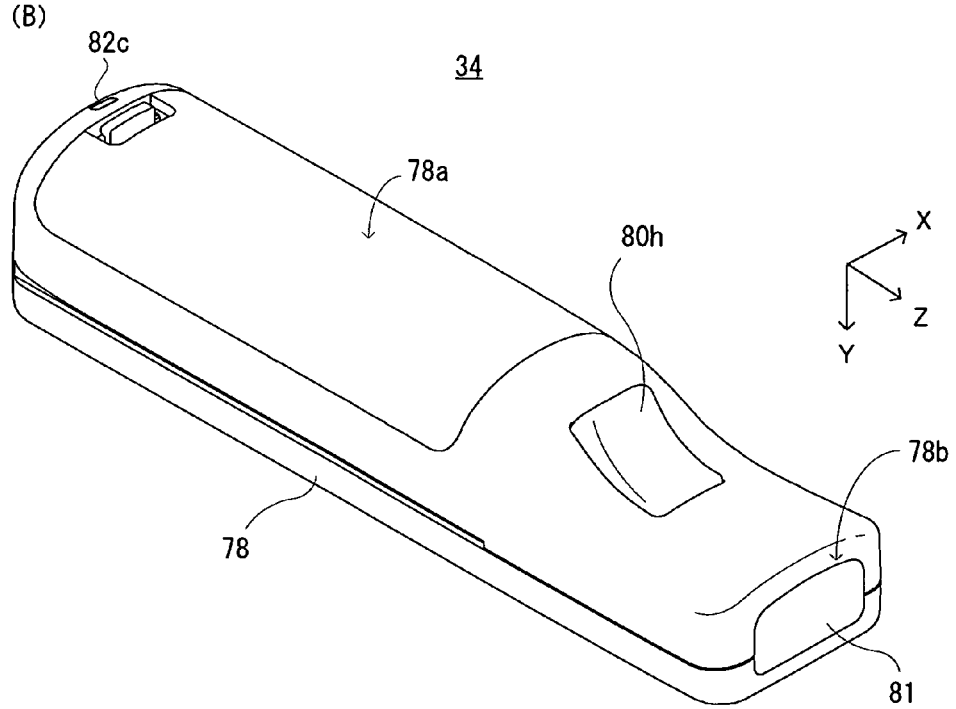

FIG. 3
(A)
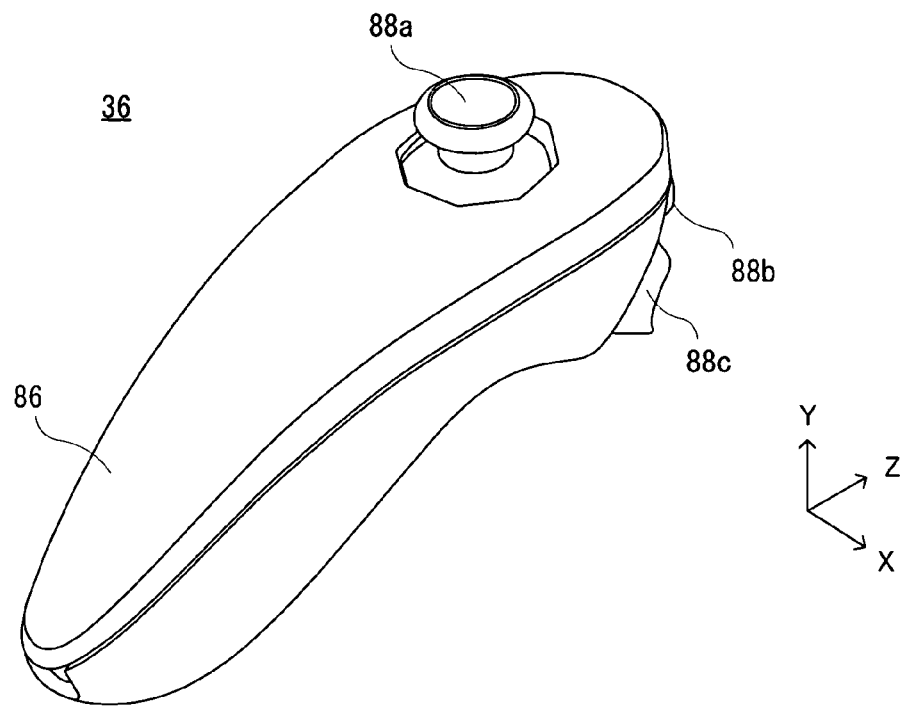
(B)
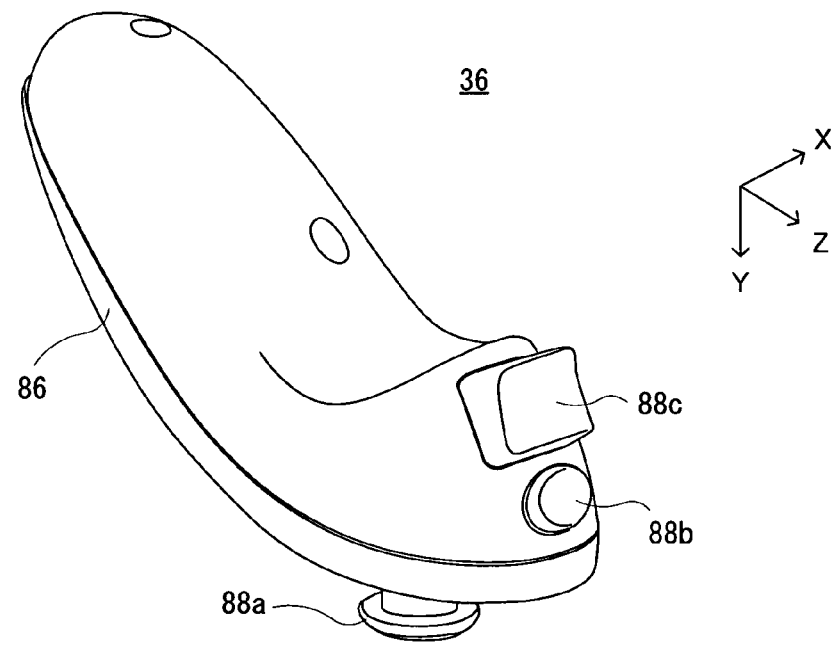

FIG. 6
(A)
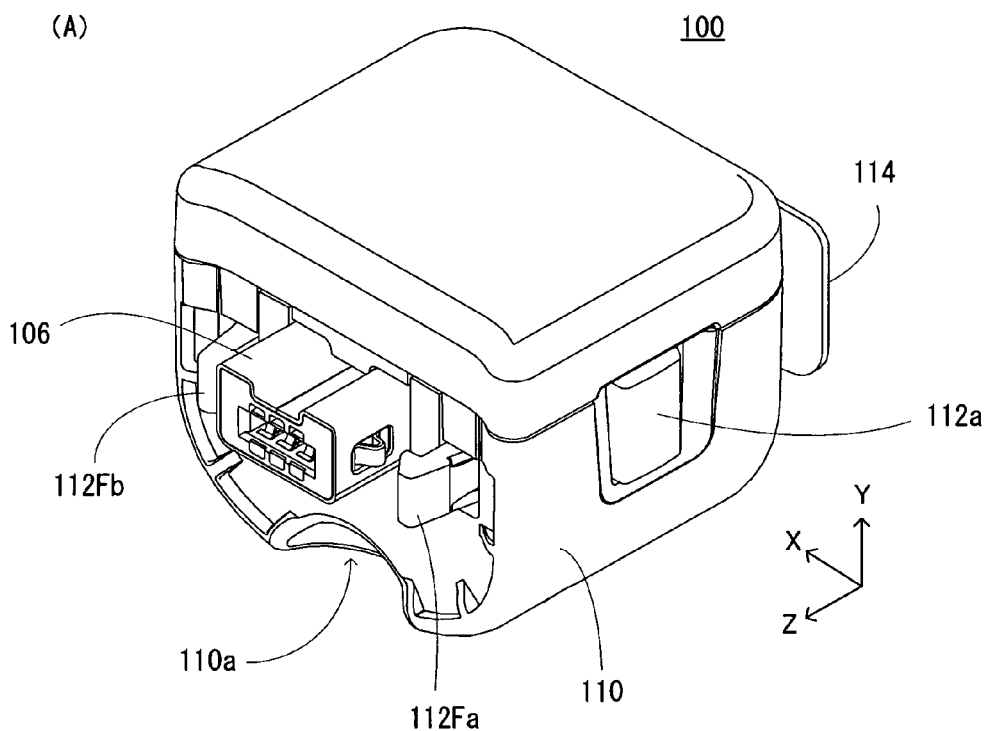
(B)
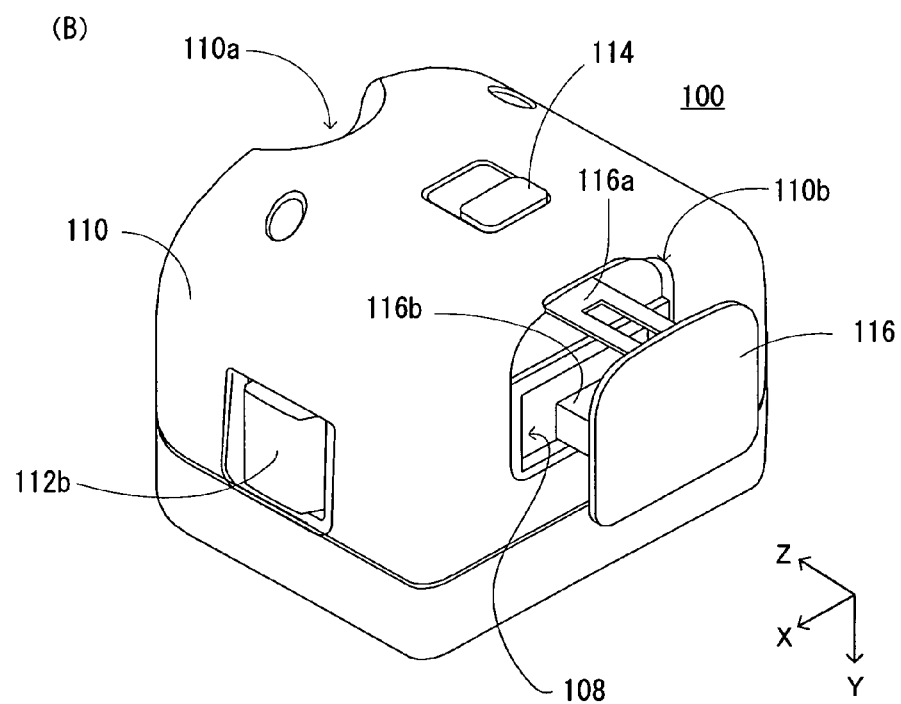

FIG. 13

(A) (DATA FORMAT FOR GYRO)

| YAW ANGULAR VELOCITY DATA |
|---|
| ROLL ANGULAR VELOCITY DATA |
| PITCH ANGULAR VELOCITY DATA |
| YAW ANGULAR VELOCITY MODE INFORMATION |
| ROLL ANGULAR VELOCITY MODE INFORMATION |
| PITCH ANGULAR VELOCITY MODE INFORMATION |
| SECOND CONTROLLER CONNECTION INFORMATION |
| GYRO/SECOND CONTROLLER IDENTIFYING INFORMATION |

(B) (DATA FORMAT FOR SECOND CONTROLLER)

| X STICK OPERATION DATA |
|---|
| Z STICK OPERATION DATA |
| X ACCELERATION DATA |
| Y ACCELERATION DATA |
| Z ACCELERATION DATA |
| BUTTON OPERATION DATA |
| SECOND CONTROLLER CONNECTION INFORMATION |
| GYRO/SECOND CONTROLLER IDENTIFYING INFORMATION |

FIG. 14

| CONTROL TARGET \ MODE | STANDBY | BYPASS | GYRO | GYRO AND SECOND CONTROLLER |
|---|---|---|---|---|
| GYRO FUNCTION | NO ACTIVE | NO ACTIVE | ACTIVE | ACTIVE |
| GYRO POWER SOURCE | OFF | OFF | ON | ON |
| BUS SWITCH | CONNECT | CONNECT | DISCONNECT | DISCONNECT |
| EXPANSION CONNECTOR | NO ACTIVE | ACTIVE | NO ACTIVE | ACTIVE |
| Attach 1 | LOW | HIGH | HIGH | HIGH |
| I2CADDRESS | SPECIAL | SPECIAL | - | - |

FIG. 15
(A) GYRO-COMPATIBLE APPOICATION
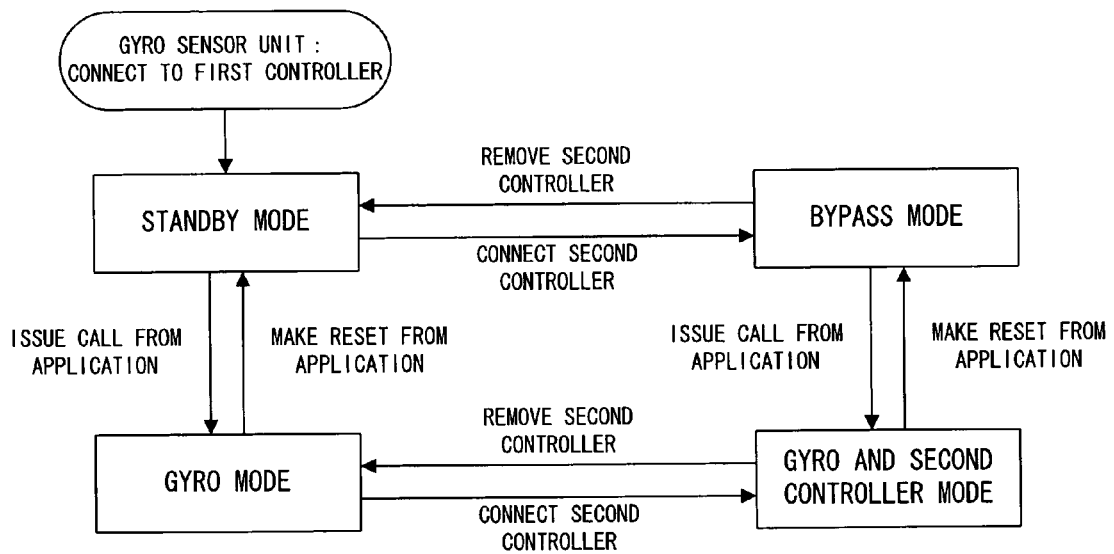
(B) GYRO-INCOMPATIBLE
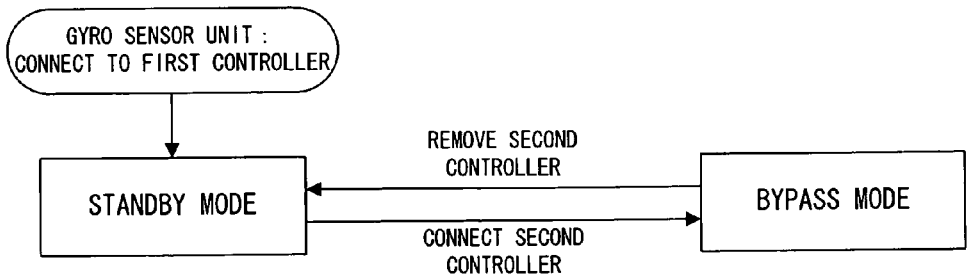

EXPANDING OPERATING DEVICE AND OPERATING SYSTEM

CROSS REFERENCE OF RELATED APPLICATION

The disclosure of Japanese Patent Application No. 2008-181419, No. 2008-181420, No. 2008-181421 are incorporated herein by reference.

BACKGROUND OF THE INVENTION

1. Field of the Invention

The invention relates to an expanding operating device and an operation system. More specifically, the present invention relates to an expanding operating device which is connected to an operating device via a connector to thereby allow the expanding operating device to be used with the operating device as a single unit, and an operation system in which a plurality of operating devices are connected to perform an operation.

2. Description of the Related Art

One example of such device is disclosed in "http://www.nintendo.co.jp/wii/controllers/index.html". In the related art, "Wii remote controller" (Wii: registered trademark) has a three-axis motion sensor for detecting changes in a tilt and a motion of itself. "Nunchaku" also has a three-axis motion sensor. The Wii remote controller as a main controller is provided with an expanding connector, and the "Nunchaku" as an expanding controller is connected to the Wii remote controller via the expanding connector.

In a certain game, the player performs an operation by holding the Wii remote controller with one hand and by moving the Wii remote controller. In another game, while holding the Wii remote controller with one hand, and the Nunchaku with the other hand, the player performs an operation by moving each of the Wii remote controller and the Nunchaku.

However, since the Wii remote controller and the Nunchaku are only provided with acceleration sensors as motion sensors, it is not easy to detect a rotative motion especially on a principle plane. More specifically, if a slice shot is done in a tennis game, for example, an angular velocity or a rotation angle about the Wii remote controller have to be detected with high accuracy. These variables can be calculated from the accelerations in the three-axis directions detected by the acceleration sensor, but each of the acceleration in the three-axis directions also includes an acceleration component by the gravity, so that complex calculation is required for evaluation the angular velocity or the rotation angle with high accuracy.

This requires that a routine for such calculation has to be incorporated in an individual game program, which imposes a high load to a developer. Furthermore, by repetitively executing such calculations, a high load is imposed on a CPU of a game apparatus. Thus, it is conceivable that a gyro sensor for detecting an angular velocity is connected to the Wii remote controller via the expanding connector.

(I) However, even in a state that the gyro sensor is connected, the Nunchaku cannot be used, so that it is impossible to play a game utilizing both of the Wii remote controller and the Nunchaku.

(II) By merely adding the gyro sensor, it is impossible to detect the motion with accuracy and ease.

Furthermore, the Wii remote controller can be attached with a strap, and the wrist of the hand holding the Wii remote controller runs through the ring of the strap attached to the Wii remote controller. Furthermore, the connector of the Nunchaku is provided with a hook, and the cord of the strap attached to the Wii remote controller is hung and retained with the hook of the connector of the Nunchaku. Thus, the connector of the Nunchaku and the expanding connector of the Wii remote controller are firmly secured with each other.

On the other hand, as described above, in a case that the gyro sensor for detecting an angular velocity is connected to the Wii remote controller via the expanding connector, it is desirable that the gyro sensor is provided with another expanding connector in order that a game can be played even in a state that the gyro sensor is connected to the expanding connector of the Wii remote controller.

(III) However, in a case that the connector of the Nunchaku is connected to the expanding connector on a side of the gyro sensor, that is, in a case that there is a gyro sensor between the Wii remote controller and the connector of the Nunchaku, it is difficult to hand and retain the cord of the strap with the hook of the connector of the Nunchaku.

SUMMARY OF THE INVENTION

Therefore, it is a primary object of the present invention to provide a novel expanding operating device and a novel operation system.

Another object of the present invention is to provide an expanding operating device capable of adding a sensor to an operating device while another device conventionally connected to the operating device is used as it is.

A still another object of the present invention is to provide an operation system capable of detecting a motion with high accuracy and ease.

A further object of the present invention is to provide an operation system in which a connector is hard to remove.

The present invention employs following features in order to solve the above-described problems. It should be noted that reference numerals and the supplements inside the parentheses show one example of a corresponding relationship with the embodiments described later for easy understanding of the present invention, and do not limit the present invention.

A first invention is an expanding operating device, by being connected to an operating device via a connector, which is used with the operating device as a single unit, and comprises a housing, a first connector having a first shape physically and electrically connectable to a connector provided to the operating device, a second connector having a second shape connectable to a connector having the first shape, and a sensor.

In the first invention, an expanding operating device (100) has a housing (110), a first connector (106), a second connector (108), and a sensor (104). The first connector has a first shape physically and electrically connectable to a connector (42) provided to an operating device. Thus, by connecting the first connector to the connector of the operating device, the expanding operating device is physically and electrically connected to the operating device via these two connectors, which allows the expanding operating device to be used with the operating device as a single unit, and eventually adds the sensor to the operating device.

On the other hand, the second connector has a second shape connectable to a connector having the first shape. Thus, a connector (the connector 40 of the second controller 36, for example) of another device conventionally connected to the connector of the operating device can also be connected to the second connector. Accordingly, if the connector of the another device is connected to the second connector in a state that the first connector is connected to the connector of the operating device, the another device is eventually connected to the operating device via the expanding operating device.

According to the first invention, the operating device can be added with the sensor while another device conventionally connected to the operating device is used as it is.

Here, the sensor is a gyro sensor (angular velocity sensor) in a preferred embodiment, but may be other motion sensors, such as an acceleration sensor, a velocity sensor, a displacement sensor, a rotation angle sensor, etc. Other than the motion sensors, there are a slant sensor, an image sensor, an optical sensor, a pressure sensor, a magnetic sensor, a temperature sensor, etc., and in a case that either sensor is added, an operation by utilizing an object to be detected by the sensor is made possible.

Furthermore, the gyro sensor in this embodiment is a three-axis sensor, but may be a two-axis sensor or a one-axis sensor. In a case of other motion sensors, the three-axis sensor is preferable, but the two-axis sensor or the one-axis sensor may be applied. In addition, the three-axis gyro sensor in this embodiment is made up of two chips of two-axis sensor and one-axis sensor, but is made up of one chip of three-axis sensor or three chips of one-axis sensors.

A second invention is an expanding operating device according to the first invention, wherein the sensor is a motion sensor for detecting a motion of itself.

In the second invention, by the motion sensor, the movements of the sensor itself and by extension, the expanding operating device and the operating device used therewith as a single unit are detected.

According to the second invention, by additionally providing the motion sensor, an operation by the movement of the operating device itself is made possible.

A third invention is an expanding operating device according to the second invention, wherein the motion sensor is a three-axis gyro sensor.

In the third invention, angular velocities about the three-axes are detected by the three-axis gyro sensor. Additionally, in a preferred embodiment, the operating device has a three-axis acceleration sensor, and the angular velocity about the three-axes can also be calculated from the accelerations in the three-axis directions in principle, but this requires a complex calculation. But, adding the three-axis gyro sensor eliminates the need of such calculation.

According to the third invention, a development of an application utilizing the operating device is made easy, and the processing load on a microcomputer for processing operation data from the operating device is reduced.

A fourth invention is an expanding operating device according to the second invention, wherein at least one through hole portion is provided on a surface to which the connector of the operating device is provided, and further comprises a protrusion member capable of being fit to the through hole portion.

In the fourth invent, at least one through hole portion (82a, 82b) is provided on a surface to which the connector of the operating device is provided, and the expanding operating device further includes a protrusion member (112Fa, 112Fb) capable of being fit to the through hole portion. The protrusion member is fit into the through hole portion, to thereby keep a firmly secured state between the expanding operating device and the operating device even during operation.

A fifth invention is an expanding operating device according to the fourth invention, wherein the protrusion member is a pawl member capable of being opened and closed, and further comprises a protrusion locking mechanism for locking the opening and closing thereof.

In the invention of the fifth invention, a pawl member capable of being opened and closed is fit into the though hole portion. The opening and closing of the pawl member is locked by a protrusion locking mechanism (114).

According to the fifth invention, a pawl member is locked in a state the member is fit into the through hole portion, which ensures firmly secured state.

A sixth invention is an expanding operating device according to the second invention, and further comprises a concave portion from a side of the first connector to a bottom surface of the housing.

In the preferred embodiment, an operating device has a housing (78) and a through hole (82c) provided from the surface of the connector of the housing to the bottom surface through which a strap (24) runs through, and in the sixth invention, a concave portion (110a) is provided from a side of the first connector to a bottom surface of the housing of the expanding operating device, and therefore, the through hole for strap is exposed from the concave portion in a state that the expanding operating device is connected to the operating device.

According to the sixth invention, it is possible to attach and detach a strap even in a state that the expanding operating device remains to be connected to the operating device.

A seventh invention is an expanding operating device according to the second invention, further comprises a lid capable of covering the second connector, and being captive from the housing in detachment.

In the seventh invention, a lid (116) for covering the second connector is captive from the housing of the expanding operating device when it is detached from the second connector.

According to the seventh invention, it is possible to prevent the lid from being lost.

An eighth invention is an expanding operating device according to the second invention, and data is fetched from an external device through the second connector, and the data from the external device and the data from the motion sensor are output to the operating device through the first connector.

In the eighth invention, data from an external device (36) is fetched in the expanding operating device through the second connector, and then output to the operating device through the first connector similar to the data from the motion sensor in the expanding operating device.

According to the eighth invention, the data from the external device is output to the operating device via the expanding operating device, and therefore, it is possible to utilize the external device even as it is if the motion sensor is added.

A ninth invention is an expanding operating device according to the eighth invention, further comprises an output data controlling means for controlling output data including the data from the sensor, a bus switch for directly connecting a line on a side of the second connector to the side of the first connector, and a bus switch controlling means for switching a connection of the bus switch between on and off, wherein when the bus switch is turned off, the line on the side of the second connector is connected to the side of the first connector via the output data controlling means.

In the ninth invention, output data including the data from the sensor is controlled by an output data controlling means (102). A line on a side of the second connector can directly be connected to a side of the first connector via a bus switch (SW), and switching on and off by the bus switch is switched by a bus switch controlling means (102). When the bus switch is turned off, the line on the side of the second connector is connected to the side of the first connector via the output data controlling means.

According to the ninth invention, when the bus switch is turned on, the data from the external device connected to the second connector is output to the operating device connected to the first connector without being controlled by the output data controlling means. On the other hand, when the bus switch is turned off, the data from the external device is under the control of the output data controlling means together with the data from the sensor, and therefore, it is possible to avoid the conflicts when two kinds of data are output.

In addition, in the preferable embodiment, the output data controlling means turns the bus switch on when the application does not use the data from the gyro sensor, and turns the bus switch off when the application uses the data from the gyro sensor. The output data controlling means alternately outputs data from the external device and data from the sensor.

A tenth invention is an expanding operating device according to the ninth invention, further comprises a sensor power managing means for switching a power supply to the sensor between on and off, and the bus switch controlling means turns the connection to the bus switch on when the power source of the sensor is turned off.

In the tenth invention, a sensor power managing means (102) switches a power supply to the sensor between on and off. The connection of the bus switch is turned on by the bus switch controlling means when the power of the sensor is turned off. Accordingly, when the power of the sensor is turned off to thereby turn the connection of the bus switch on, the data from the external device is reached to the operating device without passing through the expanding operating device.

According to the tenth invention, by turning the power of the sensor off when the data from the sensor is not utilized, it is possible to reduce electric power consumption.

An eleventh invention is an expanding operating device according to the tenth invention, further comprises a connection detecting means for detecting whether or not a predetermined device is connected to the second connector, wherein the output data controlling means alternately outputs first data output from the predetermined device and second data based on an output from the sensor from the first connector when a connection with the bus switch is turned off, and the predetermined device is connected to the second connector.

In the eleventh invention, whether or not a predetermined device (36) is connected to the second connector is detected by a connection detecting means (102). When a connection with the bus switch is turned off, and the predetermined device is connected to the second connector, the first data output from the predetermined device and the second data based on an output from the sensor from the first connector are alternately output from the first connector as a result of a control by the output data controlling means (S31).

According to the eleventh invention, it is possible to avoid the conflicts between the first data and the second data.

A twelfth invention is an expanding operating device according to the third invention, and further comprises an angular velocity determining means for determining a size of an angular velocity of each axis detected by the gyro sensor, and an angular velocity data output controlling means for outputting first angular velocity data with low accuracy in a case that the size of the angular velocity is large, and outputting second angular velocity data having data amount the same as that of the first angular velocity data and having high accuracy in a case that the size of the angular velocity is small.

In the twelfth invention, a size of an angular velocity of each axis detected by the gyro sensor is determined by the angular velocity determining means (102). An angular velocity data output controlling means (102) outputs first angular velocity data with low accuracy in a case that the size of the angular velocity is large, and outputs second angular velocity data having data amount the same as that of the first angular velocity data and having high accuracy in a case that the size of the angular velocity is small.

According to the twelfth invention, when the angular velocity is large, accuracy of the angular velocity data is made low, and when the angular velocity is small, accuracy of the angular velocity data is made high, and whereby, it is possible to improve a detection accuracy of the angular velocity and extend the detection range of the angular velocity without the data amount of the angular velocity data being increased.

A thirteenth invention is an operation system which comprises a first operating device including a first housing taking a long shape and having a thickness capable of being held by a hand, a first operating portion provided on a top surface of the first housing, the first operating portion being provided at a position that the first operating portion can be operated by a thumb of the hand, a second operating portion provided on a bottom surface of the first housing, the second operating portion being provided at a position that the second operating portion can be operated by an index finger of the hand in a state where the thumb of the hand is put on the first operating portion, a holding portion formed on the housing, the holding portion being provided at a position that the holding portion can be held by a palm and other finger(s) of the hand in a state where the thumb and the index finger of the hand are respectively put on the first operating portion and the second operating portion of the first housing, a first acceleration sensor, an imaging means provided at an end opposed to the holding portion of the first housing and a first connector provided at an end on a side of the holding portion of the first housing, and a second operating device including at least a second housing, a second connector connectable to the first connector, and a gyro sensor, wherein an operation is performed by connecting the second operating device to the first operating device.

In the thirteenth invention, an operation system (14) includes at least a first operating device (34) and a second operating device (100). The user performs an operation by connecting the second operating device to the first operating device.

The first operating device (34) includes a first housing (78) taking a long shape and having a thickness capable of being held by a hand. A first operating portion (80a, 80d, etc.) is provided on a top surface of the first housing, the first operating portion being provided at a position that the first operating portion can be operated by a thumb of the hand, and a second operating portion (80h) is provided at a position operable with a index finger of the one hand on a bottom surface of the first housing when the thumb of the one hand is placed on the first operating portion. The first housing is further provided with a holding portion (78a) at a position that the holding portion can be held by a palm and other finger(s) of the hand in a state where the thumb and the index finger of the hand are respectively put on the first operating portion and the second operating portion. Accordingly, the first operating portion and the second operating portion are located at the front end of the first housing, and the holding portion is located at the rear end of the first housing, and when holding the first housing with one hand, the user put the thumb on the top surface of the first operating portion, puts the index finger on the second operating portion of the bottom surface, and holds the holding portion with the palm and the other finger(s).

Furthermore, the first operating device further includes a first acceleration sensor (84), and the first housing is further provided with an imaging means (81) at an end opposed to the holding portion of the housing, and a first connector (42) at an end of the holding portion of the housing. On the other hand, a second operating device includes a second housing (110), a second connector (106) connectable to the first connector, and a gyro sensor (104). Accordingly, by connecting the second connector to the first connector by the user, the second operating device is connected to the first operating device. The second operating device thus connected to the first operating device is located on the side of the rear end of the first operating device, that is, in the vicinity of the wrist of the hand holding the first operating device. The acceleration value and angular velocity value output from the first acceleration sensor and the gyro sensor respectively indicate an acceleration and an angular velocity from the first and second operating devices.

According to the thirteenth invention, the gyro sensor as a means to detect an angular velocity is positioned in the vicinity of the wrist, so that the angular velocity is often detected near the rotating shaft, which makes it easy to detect the angular velocity while the acceleration sensor is positioned in front of the wrist, which makes it easy to detect a centrifugal force. That is, when seeing the operating device as a whole, the acceleration sensor is positioned forward and the gyro sensor is positioned backward, so that it is possible to provide an operation system capable of precisely detecting a motion of the hand of the player. Furthermore, by placing the second operating device at the rear end of the first operating device, the position of the center of gravity of the operating device integrated with the second operating device moves backward. The way of holding the holding portion by putting the fingers on the first operating portion and the second operating portion is similar to that in the first operating device, and therefore, in a case of rotation about the wrist, it is possible to especially improve the operability.

A fourteenth invention is an operation system according to the thirteenth invention, and the second operating device further includes a third connector, further comprises a third operating device including a fourth connector connectable with the third connector, a third housing, a second acceleration sensor, and a stick capable of inputting a direction, wherein an operation is performed by connecting the third operating device to the second operating device In the fourteenth invention, the operation system further includes a third operating device (36). The second operating device further includes a third connector (108), and the third operating device includes a fourth connector (40) connectable with the third connector. Accordingly, by further connecting the fourth connector to the third connector by the user, the third operating device is connected to the second operating device, and is also connected to the first operating device via the second operation device.

The third operating device includes a third housing (142), a second acceleration sensor (90), and a stick (88*a*) capable of inputting a direction, and data including an acceleration value of the second acceleration sensor and direction information of the stick are transmitted to the first operation device via the second operating device.

According to the fourteenth invention, the user can perform various operations according to motions of the respective devices themselves and a direction of the stick by holding the first operating device integrated with the second operating device with one hand, and the third operating device with the other hand.

A fifteenth invention is an operation system according to the thirteenth invention, and further comprises a third operating device including a third housing, a second acceleration sensor, and a stick capable of performing a direction input, wherein an operation is performed by connecting the third operating device to the second operating device via a wireless communication.

In the fifteenth invention, the operation system further includes a third operating device (36). The third operating device is connected to the second operating device by a wireless communication, and also connected to the first operating device via the second operating device. The third operating device includes a third housing (142), a second acceleration sensor (90), a stick (88*a*) capable of performing a direction input, and the acceleration value of the second acceleration sensor and the direction information of the stick can be transmitted to the first operating device through the second operating device.

According to the fifteenth invention, the user can perform various operations according to motions of the respective devices themselves and a direction of the stick by holding the first operating device integrated with the second operating device with one hand and holding the third operating device with the other hand. Furthermore, there is no cable between the second operating device and the third operating device, which allows an easy operation.

A sixteenth invention is an operation system according to the fourteenth invention, wherein the third operating device includes the second acceleration sensor and the stick inside the third housing, and the third housing and the fourth connector are connected via a bendable cable (38).

In the sixteenth invention, there is a cable between the second operating device and the third operating device.

According to the sixteenth invention, it is possible to reduce the cost in comparison with a wireless connection case.

A seventeenth invention is an operation system according to the fourteenth invention, and the fourth connector has a shape connectable with the first connector in place of the third connector.

In the seventeenth invention, the third operating device can be connected to the first operating device via the second operating device or directly.

An eighteenth invention is an expanding operating device including a second connector utilized as a second operating device in the invention according to claim 13 or 17, a housing, and a gyro sensor.

By also the eighteenth invention, similar to the thirteenth invention, it is possible to heighten safety and detection accuracy.

A nineteenth invention is an operation system according to the thirteenth invention, and the second operating device further includes a output data controlling means for performing a control on data to be output to the first operating device via the second connector, and the first operating device further includes a communicating means for transmitting at least data on the basis of outputs from the first operating portion, the second operating portion, the first acceleration sensor and the imaging means, and data output from the second operating device via the second connector.

In the nineteenth invention, the second operating device further includes an output data controlling means (102), and data to be output to the first operating device via the second connector is subject to a control by the output data controlling means. The first operating device further includes a communicating means (92), and data on the basis of outputs from the first operating portion, the second operating portion, the first acceleration sensor and the imaging means and data output from the second operating device via the second connector are transmitted by the communication means.

A twentieth invention is an operation system according to the nineteenth invention, and the second operating device further includes a third connector, and further comprises a third operating device including a fourth connector connectable to the third connector, a third housing, a second acceleration sensor, and a stick capable of inputting a direction, and connecting the third operating device to the second operating device to perform an operation, wherein the communicating means further transmits data output from the third operating device via the fourth connector.

In the twentieth invention, the operation system further includes a third operating device (36). The second operating device further includes a third connector (108), and the third operating device includes a fourth connector (40) connectable to the third connector. Accordingly, by connecting the fourth connector to the third connector by the user, the third operating device is connected to the second operating device, and further connected to the first operating device via the second operating device. Furthermore, the third operating device further includes a third housing (142), an acceleration sensor (90), and a stick (88a) capable of inputting a direction, and the data including an acceleration value of the second acceleration sensor and direction information of the stick are also transmitted through the second operating device by the communicating means of the first operating device.

According to the twentieth invention, the user can perform various operations on the basis of motions of the respective devices themselves and a direction of the stick by holding the first operating device integrated with the second operating device with one hand, and the third operating device with the other hand.

A twenty-first invention is an operation system according to the twentieth invention, and the second operating device further includes a bus switch for directly connecting a line on a side of the third connector to a side of the second connector, a bus switch controlling means for switching the bus switch between on and off, wherein the line on the side of the third connector is connected to the side of the second connector via the output data controlling means when the bus switch is turned off.

In the twenty-first invention, the line on a side of the third connector can directly be connected to a side of the second connector via a bus switch (SW), and turning on and off the connection by the bus switch is switched by a bus switch controlling means (102). When the bus switch is turned off, the line on the side of the third connector is connected to the side of said second connector via the output data controlling means.

According to the twenty-first invention, when the bus switch is turned on, the data from the third operating device connected to the third connector is output to the first operating device connected to the second connector without being subtract to a control by the output data controlling means. On the other hand, when the bus switch is turned off, the data from the third operating device is under the control of the output data controlling means together with the data from the gyro sensor, and therefore, it is possible to avoid the conflicts when these two kinds of data are output.

Additionally, in the preferred embodiment, the output data controlling means turns the bus switch on when the application does not utilize data from the gyro sensor, and turns the bus switch off when the application utilizes data from the gyro sensor. The output data controlling means alternately outputs data from the third operating device and data from the gyro sensor.

A twenty-second invention is an operation system according to the twenty-first invention, and further includes a gyro sensor power managing means for switching a power supply to the gyro sensor between on and off, wherein the bus switch controlling means turns the connection of the bus switch on when the power source of the gyro sensor is turned off.

In the twenty-second invention, a sensor power managing means (102) switches a power supply to the gyro sensor between on and off. The connection of the bus switch is turned on by the bus switch controlling means when the power source of the gyro sensor is turned off. Accordingly, when the power of the gyro sensor is turned off, the connection of the bus switch is turned on, and the data from the third operating device is reached to the first operating device without passing through the second operating device.

According to the twenty-second invention, by turning the power of the gyro sensor off when the data from the gyro sensor is not utilized, electric power consumption can be reduced.

A twenty-third invention is an operation system according to the twenty-second invention, and the second operating device further includes a connection detecting means for detecting whether or not the third operating device is connected to the third connector, the output data controlling means alternately outputs first data input from the third operating device and second data based on the output from the gyro sensor to the first operating device when the connection of the bus switch is turned off, and the third operating device is connected to the third connector.

In the twenty-third invention, whether or not the third operating device (36) is connected to the third connector is detected by a connection detecting means (102). When the connection of the bus switch is turned off, and the third operating device is connected to the third connector, first data input from the third operating device and second data based on the output from the gyro sensor are alternately output from the second connector as a result of a control by the output data controlling means (S31).

According to the twenty-third invention, it is possible to avoid the conflicts between the first data and the second data.

A twenty-fourth invention is an operation system which has a first operating device, a second operating device and a third operating device, and in the operation system in which an operation is performed by connecting the first operating device, the second operating device and the third operating device or by connecting the first operating device and the third operating device, the first operating device comprises a motion sensor for detecting a motion of the first operating device itself; a strap attaching portion attachable with a strap and a first connector, and the second operating device comprises a second connector connectable to the first connector; a third connector and a lid capable of covering the third connector and being captive from the second operating device in a state that it is detached from the third connector, and the third operating device comprises a fourth connector selectively connectable to the first and the third connectors; a hook provided in a vicinity of the fourth connector, wherein the hook can hang the strap when the first operating device and the third operating device are connected by a connection between the first connector and the fourth connector, and the hook can hang the lid when the second operating device and the third operating device are connected by a connection between the third connector and the fourth connector.

In the twenty-fourth invention, an operation system (14) has a first operating device (34), a second operating device (100) and a third operating device (36). The user performs an operation by connecting the first operating device, the second operating device and the third operating device or by connecting the first operating device and the third operating device.

Specifically, the first operating device has a first connector (42), the second operating device has a second connector (106) and a third connector (108), and the third operating device has a fourth connector (40). The second connector can be connected to the first connector, and the fourth connector can selectively be connected to the first and third connectors. By connecting the second connector to the first connector, and further connecting the fourth connector to the third connector by the user, the first operating device, second operating device and the third operating device are connected with each other. By connecting the fourth connector to the first connector, the first operating device and the third operating device are connected one another.

Furthermore, the first operating device further includes a motion sensor (84), and a motion of the first operating device itself is detected by the motion sensor.

The first operating device also includes a strap attaching portion (82c) to which a strap (24) is attached. The second operating device further includes a lid (116), and by the lid, the third connector is covered. The lid is captive from the second operating device in a state that it is detached from the third connector. The third operating device further includes a hook (144) provided in the vicinity of the fourth connector, and the hook can hang the strap attached to the first operating device when the first operating device is connected to the third operating device, and can hang the lid captive from the second operating device when the third operating device is connected to the second operating device.

According to the twenty-fourth invention, by hanging and retaining the lid with the hook, the fourth connector is hard to detach from the third connector.

A twenty-fifth invention is an operating device (100) utilized as the second operating device in the operation system according to the twenty-fourth invention, and comprises the second connector, the third connector, and the lid.

By also the twenty-fifth invention, similar to the twenty-fourth invention, the connector is hard to detach.

A twenty-sixth invention is an operation system according to the twenty-fourth invention, and the motion sensor is an acceleration sensor.

In the twenty-sixth invention, it is possible to detect an acceleration by the acceleration sensor.

Generally, the motion of the object is represented by variables, such as an acceleration, a velocity, an angular velocity, etc., but the velocity and the angular velocity can be calculated from the acceleration. According to the twenty-sixth invention, an acceleration is detected to thereby perform an operation by utilizing a motion of the operating device itself.

A twenty-seventh invention is an operation system according to the twenty-fourth invention, and the second operating device further includes a gyro sensor (104).

According to the twenty-seventh invention, it is possible to add the gyro sensor as required. By adding the gyro sensor, in the processing apparatus (application) for processing operation data from the operation system, an angular velocity is not required to be calculated, so that the processing load is reduced.

A twenty-eighth invention is an operation system according to the twenty-fourth invention, and the third operating device further includes an acceleration sensor (90) and a stick (88a) capable of inputting a direction.

According to the twenty-eighth invention, by giving an acceleration sensor to each of the first operating device and the third operating device, the user can move the first operating device and the third operating device independently. Furthermore, by giving the stick to the third operating device, the user can input a direction with the stick while moving the third operating device itself. Thus, it is possible to perform various operations.

According to the present invention, the operating device can be added with the sensor while another device conventionally connected to the operating device is used as it is.

According to the present invention, it is possible to provide the operation system that the player can easily operate. Furthermore, it is possible to provide the operation system capable of detecting the motion of the operating device with high accuracy.

According to the present invention, since the connector of the third operating device (Nunchaku) is hard to detach from the expanding connector of the second operating device (gyro sensor unit), even if the second operating device is added between the first operating device (Wii remote controller) and the third operating device, it is possible to maintain the security of the operation system.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing an appearance of a first controller applied to FIG. 1 embodiment, FIG. 2(A) is a perspective view of the first controller as seeing it from above rear, and FIG. 2(B) is a perspective view of the first controller as seeing it from below front;

FIG. 3 is an illustrative view showing an appearance of a second controller applied to FIG. 1 embodiment, FIG. 3(A) is a perspective view of the second controller as seeing it from above rear, and FIG. 3(B) is a perspective view of the second controller as seeing it from below front;

FIG. 6 is an illustrative view showing an appearance of a gyro sensor unit applied to FIG. 1 embodiment, FIG. 6(A) is a perspective view of the gyro sensor unit as seeing it from above front, and FIG. 6(B) is a perspective view of the gyro sensor unit as seeing it from rear back;

FIG. 13 is an illustrative view showing a data format dealt by the gyro sensor unit, and FIG. 13(A) is an illustrative view showing a format of gyro data and FIG. 13(B) is an illustrative view showing a format of second controller data;

FIG. 14 is an illustrative view showing a table in which a control of the gyro sensor unit by a microcomputer is described for each mode;

FIG. 15 is an illustrative view showing a mode switching applied to the gyro sensor unit, and FIG. 15(A) is an illustrative view showing a mode switching when the application is a gyro-compatible type, and FIG. 15(B) is an illustrative view showing a mode switching when the application is a gyro-incompatible type;

DETAILED DESCRIPTION OF THE PREFERRED EMBODIMENTS

Figure 1:
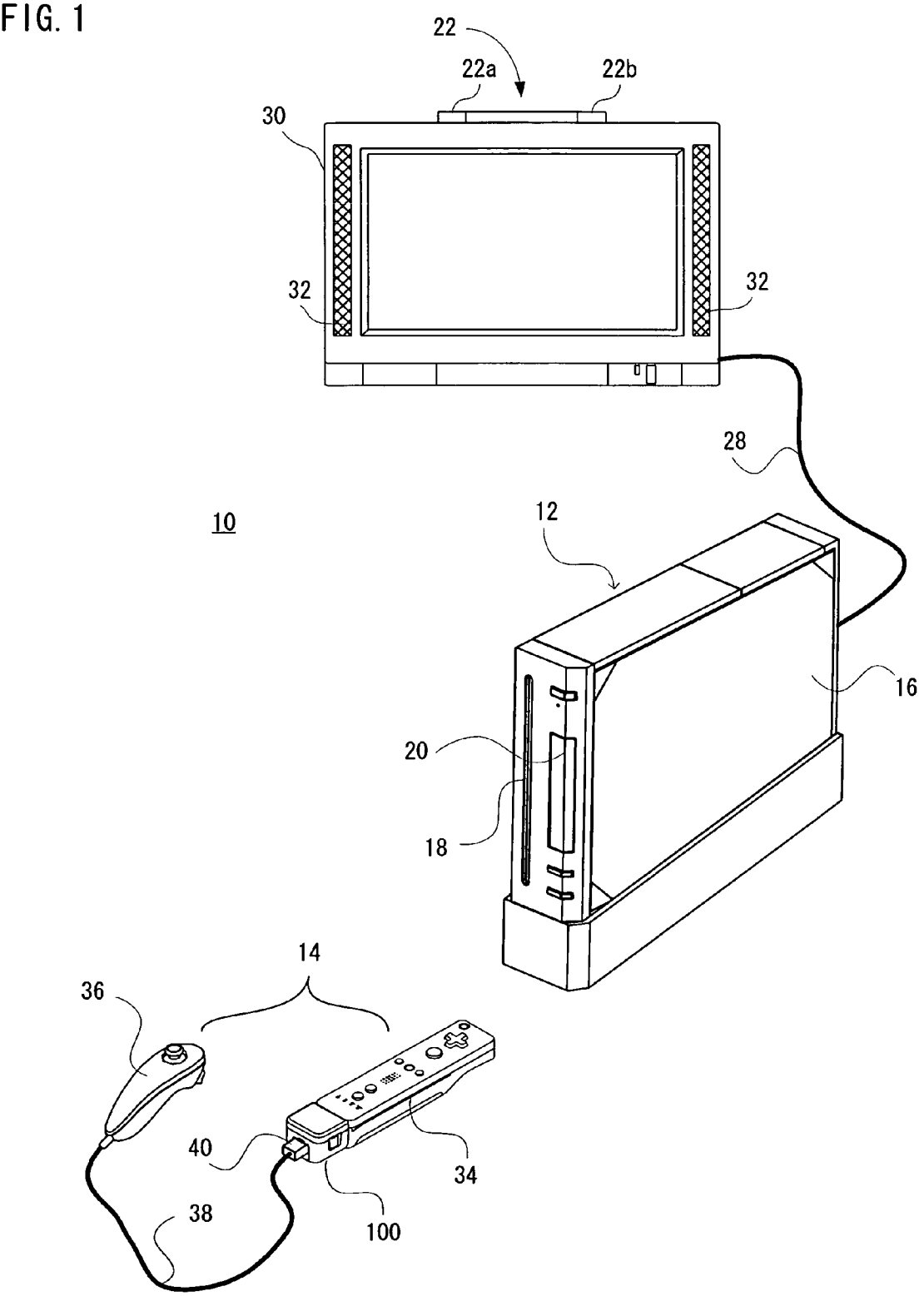
FIG. 1 is a block diagram showing a configuration of one embodiment of the present invention.

Referring to FIG. 1, a game system 10 of one embodiment of the present invention includes a game apparatus 12 and a controller 14. The game apparatus 12 is a game console. The controller 14 is an input device or an operating device by a user or a player. The game apparatus 12 and the controller 14 are connected by radio.

The game apparatus 12 includes a roughly rectangular parallelepiped housing 16, and the housing 16 is furnished with a disk slot 18 and a memory card slot cover 20 on a front surface. An optical disk 66 (FIG. 10) as one example of an information storage medium storing game program and data, etc. is inserted from the disk slot 18 to be loaded into a disk drive 54 (see FIG. 10) within the housing 16. Inside the memory card slot cover 20 is provided a connector for external memory card 62 (FIG. 10) through which a memory card (not shown) is inserted. The external memory card is employed for loading the game program, etc. read from the optical disk 66 (FIG. 10) to temporarily store it, storing (saving) game data (result data or proceeding data of the game) of the game played by means of the game system 10, and so forth. It should be noted that storing the game data described above may be performed on an internal memory such as a flash memory in place of the external memory card.

The game apparatus 12 has an AV cable connector (not illustrated) on a rear surface of the housing 16, and by means of the connector, the game apparatus 12 is connected to a monitor (display) 30 via an AV cable 28. The monitor 30 is typically a color television receiver, and through the AV cable 28, a video signal from the game apparatus 12 is input to a video input terminal of the color television, and a sound signal is input to a sound input terminal thereof. Accordingly, a game image of a three-dimensional (3D) video game, for example, is displayed on the screen of the color television (monitor) 30, and a stereo game sound, such as a game music, a sound effect is output from integrated speakers 32.

Additionally, around the monitor 30 (upper side of the monitor 30 in this embodiment), a marker unit 22 having two infrared ray LEDs (markers) 22a and 22b is provided. The markers 22a and 22b output infrared rays forward the monitor 30.

Furthermore, the power of the game apparatus 12 is applied by means of a general AC adapter (not illustrated). The AC adapter is inserted into a standard wall outlet for home use, and transforms the house current to a low DC voltage signal suitable for driving the game apparatus 12. In another embodiment, a battery may be utilized as a power supply. The marker unit 22 is connected to the game apparatus 12 through a power wire not shown so as to be supplied with power.

The controller 14, which is described in detail later, includes a first controller 34 and a second controller 36 each capable of being held with one hand and a gyro sensor unit 100 attached to the first controller 34. On a rear end surface of the first controller 34, a connector 42 (FIG. 2(A), FIG. 11) is provided, and at an end of a cable 38 extending from the rear end of the second controller 36, a connector 40 (FIG. 4, FIG. 11) is provided, and on a front end surface and a rear end surface of the gyro sensor unit 100, connectors 106 and 108 (FIG. 6(A), FIG. 6(B), FIG. 7 and FIG. 11) are respectively provided. The connector 106 at the front end surface of the gyro sensor unit 100 is connectable to the connector 42 of the first controller 34, and the connector 40 of the second controller 36 is connectable to the connector 42 of the first controller 34 or the connector 108 at the rear end surface of the gyro sensor unit 100.

By connecting the connector 106 to the connector 42, the gyro sensor unit 100 is physically and electrically connected to the first controller 34. From the gyro sensor unit 100 thus attached (connected as a single unit) to the first controller 34, angular velocity data indicating an angular velocity of the first controller 34 is output.

In a case that the gyro sensor unit 100 is thus attached to the first controller 34, the connector 40 of the second controller 36 is connected to the connector 108 at the rear end surface of the gyro sensor unit 100. That is, the connector 42 has a structure selectively connectable to either of the connector 106 or the connector 40, and the connector 40 has a structure of selectively connectable to either of the connector 42 or the connector 108. Accordingly, the connector 106 and the connector 108 provided to the gyro sensor unit 100 cannot actually be connected because of being a part of the same housing, but have shapes connectable with each other. Input data from the second controller 36 is applied to the first controller 34 via the cable 38 and the gyro sensor unit 100. The first controller 34 transmits controller data including input data from the first controller 34 itself, angular velocity data from the gyro sensor unit 100, and input data from the second controller 36 to the game apparatus 12.

On the other hand, in a case that the connector 40 is connected to the connector 42, operation data or input data from the second controller 36 are applied to the first controller 34 via the cable 38, and the first controller 34 transmits controller data including input data from the first controller 34 itself and the input data from the second controller 36 to the game apparatus 12.

In the system here for transmitting input data from the first controller 34 and input data from the second controller 36, a data amount to be transmitted at a time may sometimes be designed so as not be added, but in a case that the gyro sensor unit 100 is added, angular velocity data from the gyro sensor unit 100 and input data from the second controller 36 are alternately output to the first controller 34, which allows both of the data to be transmitted. The data control can be performed by the gyro sensor unit 100, so that the first controller 34 and the second controller 36 are not required to be changed in design.

Thus, the gyro sensor unit 100 is an expanding unit for adding a gyro function to the first controller 34 by utilizing the existing first controller 34 and second controller 36 as it is.

In the game system 10, a user turns the power of the game apparatus 12 on for playing the game (or another application), then selects an appropriate optical disk 66 storing a video game (or another application the player wants to play), and loads the optical disk 66 into the disk drive 54 through the disk slot 18 of the game apparatus 12. In response thereto, the game apparatus 12 starts to execute a video game or another application on the basis of the software stored in the optical disk 66. The user operates the controller 14 in order to apply an input to the game apparatus 12.

FIG. 2 shows one example of an appearance of the first controller 34. FIG. 2(A) is a perspective view of the first controller 34 as seeing it from above rear, and FIG. 2(B) is a perspective view of the first controller 34 as seeing it from below front.

The first controller 34 has a housing 78 formed by plastic molding, for example. The housing 78 is formed into an approximately rectangular parallelepiped shape regarding a back and forth direction (Z-axis direction shown) as a longitudinal direction, and has a size small enough to be held by one hand of a child and an adult. As one example, the housing 78 has a length or a width approximately the same as that of a palm of a person. A player can perform a game operation by means of the first controller 34, that is, by pushing buttons provided on it and by changing a position and a direction of the first controller 34 itself.

The housing 78 is provided with a plurality of operation buttons. That is, on the top surface of the housing 78, a cross key 80a, an X button 80b, a Y button 80c, an A button 80d, a select switch 80e, a menu switch 80f, and a start switch 80g are provided. Meanwhile, on the bottom surface of the housing 78, a concave portion is formed, and on the reward inclined surface of the concave portion, a B button 80h is provided. Each of the buttons (switches) 80a-80h is assigned an appropriate function depending on a game program to be executed by the game apparatus 12. Furthermore, the housing 78 has a power switch 80i for turning on and off the power of the main body of the game apparatus 12 from a remote place on a top surface. The respective buttons (switches) provided on the first controller 34 may inclusively be indicated with the use of the reference numeral 80.

Within the housing 78, an acceleration sensor 84 (FIG. 11) for detecting accelerations in three-axis directions of X, Y and Z (that is, right and left direction, up and down direction and forward and reward direction) shown in FIG. 2 is provided. Alternatively, as an acceleration sensor 84, a two-axis acceleration sensor for detecting acceleration in any two directions out of the right and left direction, up and down direction and forward and reward direction may be used depending on the restriction on a shape of the housing 78, a way of holding the first controller 34, or the like. Under certain circumstances, one-axis acceleration sensor may be used.

On the front surface of the housing 78, a light incident opening 78b is formed, and inside the housing 78, an imaged information arithmetic section 81 is further provided. The imaged information arithmetic section 81 is made up of a camera for imaging infrared rays and an arithmetic operation portion for calculating coordinates of imaged objects within an image, and captures an object scene including the above-described markers 22a and 22b by the infrared rays to calculate position coordinates of the markers 22a and 22b within the object scene.

On the rear surface of the housing 78, the above-described connector 42 is provided. The connector 42 is utilized for connecting other equipment to the first controller 34. In this embodiment, the connector 42 is connected with the connector 40 of the second controller 36 or the connector 106 of the gyro sensor unit 100.

Moreover, on the rear surface of the housing 78, a pair of through holes 82a and 82b is formed in such positions as to be symmetrically with each other (X-axis direction) about the connector 42. The pair of through holes 82a and 82b is for being inserted with hooks 112Fa and 112Fb (FIG. 6(A)) for securing the gyro sensor unit 100 at the rear surface of the housing 78. At the rear surface of the housing 78, a through hole 82c for attaching a strap 24 (FIG. 5) is also provided.

FIG. 3 is an illustrative view showing one example of an appearance of the second controller 36 itself. FIG. 3(A) is a perspective view of the second controller 36 as seeing it from above rear, and FIG. 3(B) is a perspective view of the second controller 36 as seeing it from below front. In FIG. 3, the cable 38 of the second controller 36 is omitted here.

The second controller 36 has a housing 86 formed by plastic molding, for example. The housing 86 is formed into an approximately thin long elliptical shape in the forward and backward directions (Z-axis direction) when viewed from plane, and the width of the right and left direction (X-axis direction) at the rear end is narrower than that of the front end. Furthermore, the housing 86 has a curved shape as a whole when viewed from a side, and downwardly curved from a horizontal portion at the front end to the rear end. The housing 86 has a size small enough to be held by one hand of a child and an adult similar to the first controller 34 as a whole, and has a longitudinal length (in the Z-axis direction) slightly shorter than that of the housing 78 of the first controller 34. Even with the second controller 36, the player can perform a game operation by operating buttons and a stick, and by changing a position and a direction of the controller itself.

At the front end of the top surface of the housing 86, an analog joystick 88a is provided. At the end of the housing 86, a front edge slightly inclined backward is provided, and on the front edge are provided a C button 88b and a Z button 88c vertically (Y-axis direction in FIG. 3) arranged. The analog joystick 88a and the respective buttons 88b and 88c are assigned appropriate functions according to a game program to be executed by the game apparatus 12. The analog joystick 88a and the respective buttons 88b and 88c provided to the second controller 36 may be inclusively denoted by means of the reference numeral 88.

Inside the housing 86 of the second controller 36, an acceleration sensor 90 (FIG. 11) is provided. As the acceleration sensor 90, an acceleration sensor similar to the acceleration sensor 84 in the first controller 34 is applied. More specifically, a three-axis acceleration sensor is applied in this embodiment, and detects accelerations in each of the three axis directions such as an up and down direction (Y-axial direction shown), a right and left direction (X-axial direction shown), and a forward and backward direction (Z-axial direction shown) of the second controller 36. Accordingly, similar to the case of the first controller 34, proper arithmetic process is performed on the detected acceleration to thereby calculate a slant and a rotation of the second controller 36 and an orientation of the acceleration sensor 90 in the direction of gravity. Furthermore, it is possible to calculate a motion applied to the first controller 34 by swinging, etc. as with the case of the second controller 36.

Figure 4:
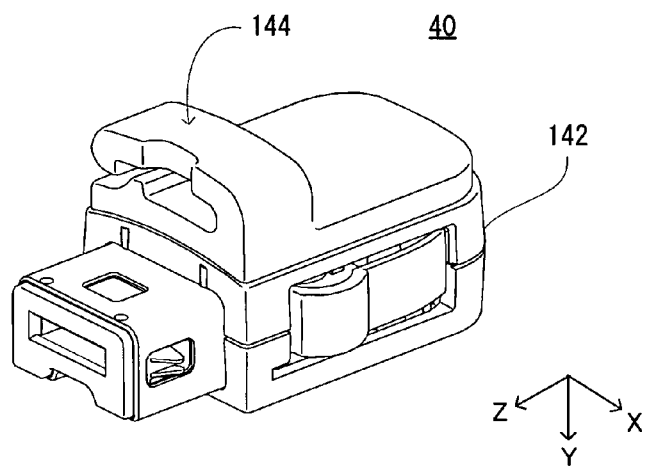
FIG. 4 is an illustrative view showing an appearance of a connector of the second controller.
Figure 5:
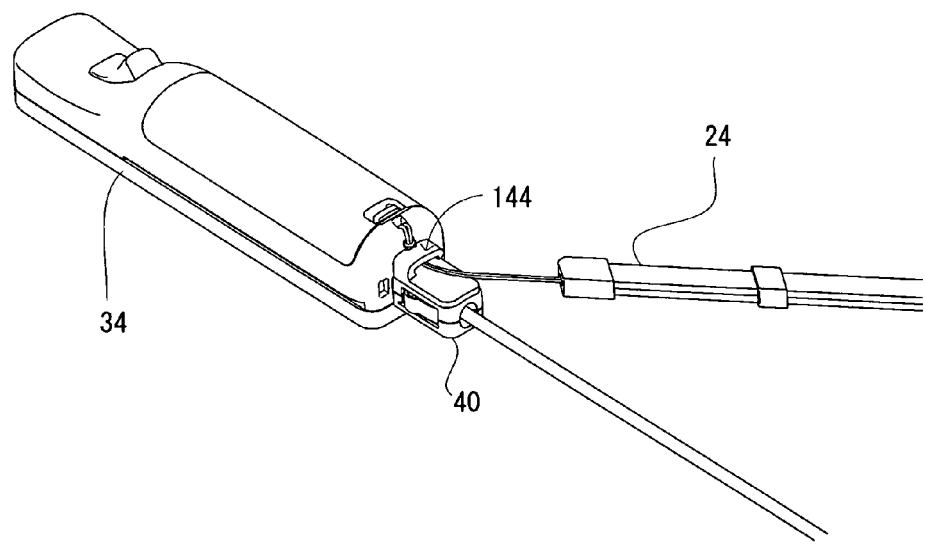
FIG. 5 is an illustrative view showing a manner in which a cord of a strap attached to the first controller is hang and retained with a hook of the connector in a state that the connector of the second controller is connected the first controller.

FIG. 4 shows one example of an appearance of the connector 40 of the second controller 36. FIG. 4 is a perspective view of the connector 40 as seeing it from below front. Here also, the cable 38 is omitted. The connector 40 has a housing 142 formed by a plastics molding, for example. At the bottom surface of the housing 142, a hook 144 is provided. The hook 144 is for intrinsically hanging and retaining a cord of the strap 24 attached to the first controller 34 when the connector 40 is directly connected to the first controller 34 (of the connector 42) as shown in FIG. 5. By hanging and retaining the cord of the strap 24 on the hook 144, it is possible to tightly secure the connector.

FIG. 6 shows one example of an appearance of the gyro sensor unit 100. FIG. 6(A) is a perspective view of the gyro sensor unit 100 as seeing it from above front, and FIG. 6(B) is a perspective view of the gyro sensor unit 100 as seeing it from rear back.

The gyro sensor unit 100 has a housing 110 formed by a plastics molding, for example. The housing 110 has an appropriately rectangular parallelepiped shape, and the length is ⅕ of the length of the housing 78 of the first controller 34, and the width and thickness are approximately the same as those of the housing 78. The player can play a game operation by changing a position and a direction of the first controller 34 itself even if the first controller 34 is attached with the gyro sensor unit 100.

On the front surface and the rear surface of the housing 110, the above-described connectors 106 and 108 are provided, on the side surfaces of the housing 110, a pair of release buttons 112a and 112b are provided, and the bottom surface of the housing 110, a lock switch 114 is provided. An approximately sphere concave portion 110a is provided from the end of the front surface of the housing 110 to the bottom surface such that the through hole 82c for the strap 24 is exposed in a state that the first controller 34 is attached with the gyro sensor unit 100 (FIG. 8).

A pair of hooks 112Fa and 112Fb which are respectively associated with the release buttons 112a and 112b are provided on a front surface of the housing 110 at positions symmetrically with each other (Y-axis direction in FIG. 3) in a horizontal direction (X-axis direction) about the connector 106. When the connector 106 is connected to the connector 42 in order to attach the gyro sensor unit 100 to the first controller 34, the pair of hooks 112Fa and 112Fb are inserted to the pair of through holes 82a and 82b (FIG. 2(A)) at the rear surface of the housing 78, and the pawls of the hooks 112Fa and 112Fb are engaged with the inner wall of the housing 78. Thus, the gyro sensor unit 100 is fixed to the rear surface of the first controller 34.

Figure 8:
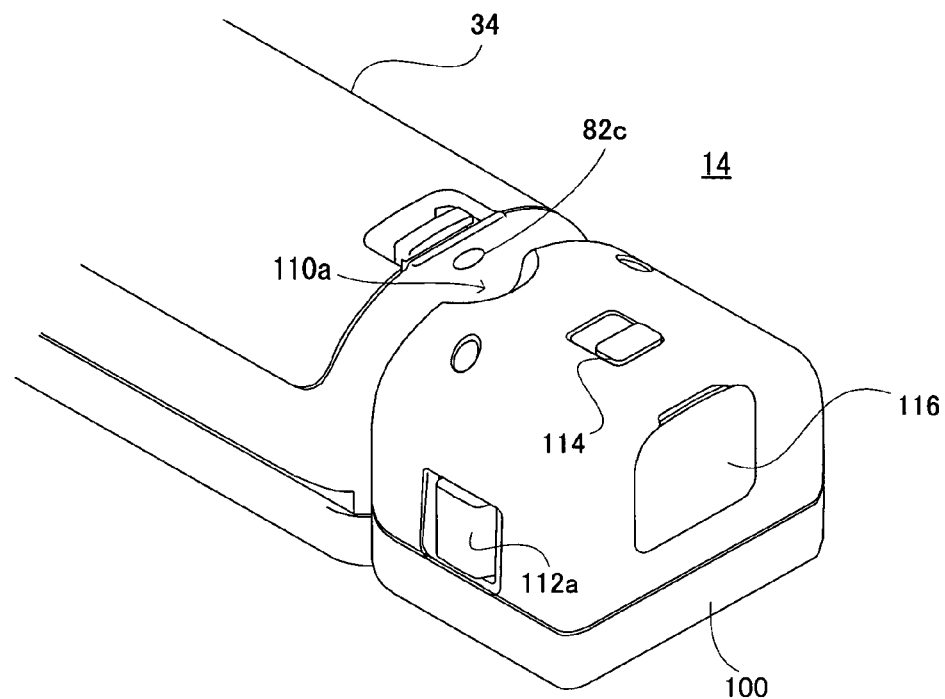
FIG. 8 is an illustrative view showing a state in which the gyro sensor unit is connected to the first controller.

FIG. 8 shows the gyro sensor unit 100 thus attached to the first controller 34. When the pair of release buttons 112a and 112b are pushed in this state, the engagement of the pawls are released to allow the gyro sensor unit 100 to be detached from the first controller 34.

A lock switch 114 is a sliding switch for locking such the release buttons 112a and 112b. The release buttons 112a and 112b cannot be pushed (locked state) when the lock switch 114 is in a first position (toward the rear side, for example), and the release buttons 112a and 112b can be pushed (released state) when the lock switch 114 is in a second position (toward the front, for example). Within the housing 110, locking springs 118a and 118b (FIG. 7) are provided and constructed so as to be repulsed when the release button 112a and 112b are pushed, and so as to maintain the engaged state when the release button 112a and 112b are not pushed. Thus, in order to remove the gyro sensor unit 100, the user has to push the release buttons 112a and 112b after sliding the lock switch 114 from the first position to the second position.

Since the gyro sensor unit 100 is attached to the rear surface of the first controller 34, a centrifugal force applied to the gyro sensor unit 100 during the game is exclusively worked such that the gyro sensor unit 100 is pressed against the first controller 34. Furthermore, the gyro sensor unit 100 is fixed to the rear surface of the first controller 34 by the hooks 112Fa and 112Fb while the lock switch 114 is provided to the release buttons 112a and 112b for releasing the hooks 112Fa and 112Fb, and therefore, even during operating the game, it is possible to bring about a tightly secured state between the gyro sensor unit 100 and the first controller 34.

On the rear surface of the housing 110, a concave portion 110b capable of housing the connector cover 116 to be attached to the connector 108 is provided on the periphery of the connector 108. The connector cover 116 has a narrow thin (that is, can be bended) protrusion 116a extending in a forward and backward (Z-axis direction) direction on the one end of the main surface. The end portion of the protrusion 116a is engaged with the housing 110, and the connector cover 116 is captive from the housing 110 in a state that it is removed from the connector 108.

Figure 9:
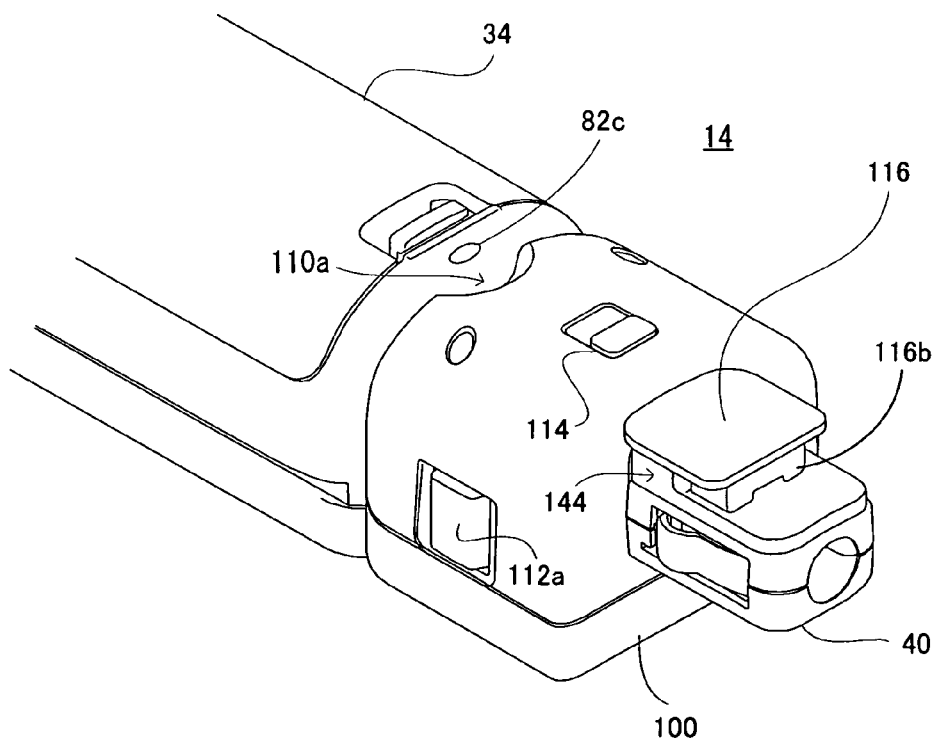
FIG. 9 is an illustrative view showing a state in which the second controller is connected to the first controller via the gyro sensor unit.

The connector cover 116 has a narrow thick (that is, is hard to bend) protrusion 116b extending in a right and left direction (X-axis direction) on the other end of the main surface. The thickness of the protrusion 116b (height of the Z-axis direction) is approximately the same as the thickness (height of the Y-axis direction) of the hook 144 (FIG. 4) provided to the connector 40 of the second controller 36. In a case that the second controller 36 is connected to the first controller 34 via the gyro sensor unit 100, the main surface of the connector cover 116 is made level to be engaged with the side surface of the hook 144 of the connector 40 as shown in FIG. 9. By thus incorporating the connector cover 116 detached from the connector 108 into the connector 40, the connector 40 is tightly secured to the gyro sensor unit 100 as well as is improved in operability and appearance.

Figure 7:
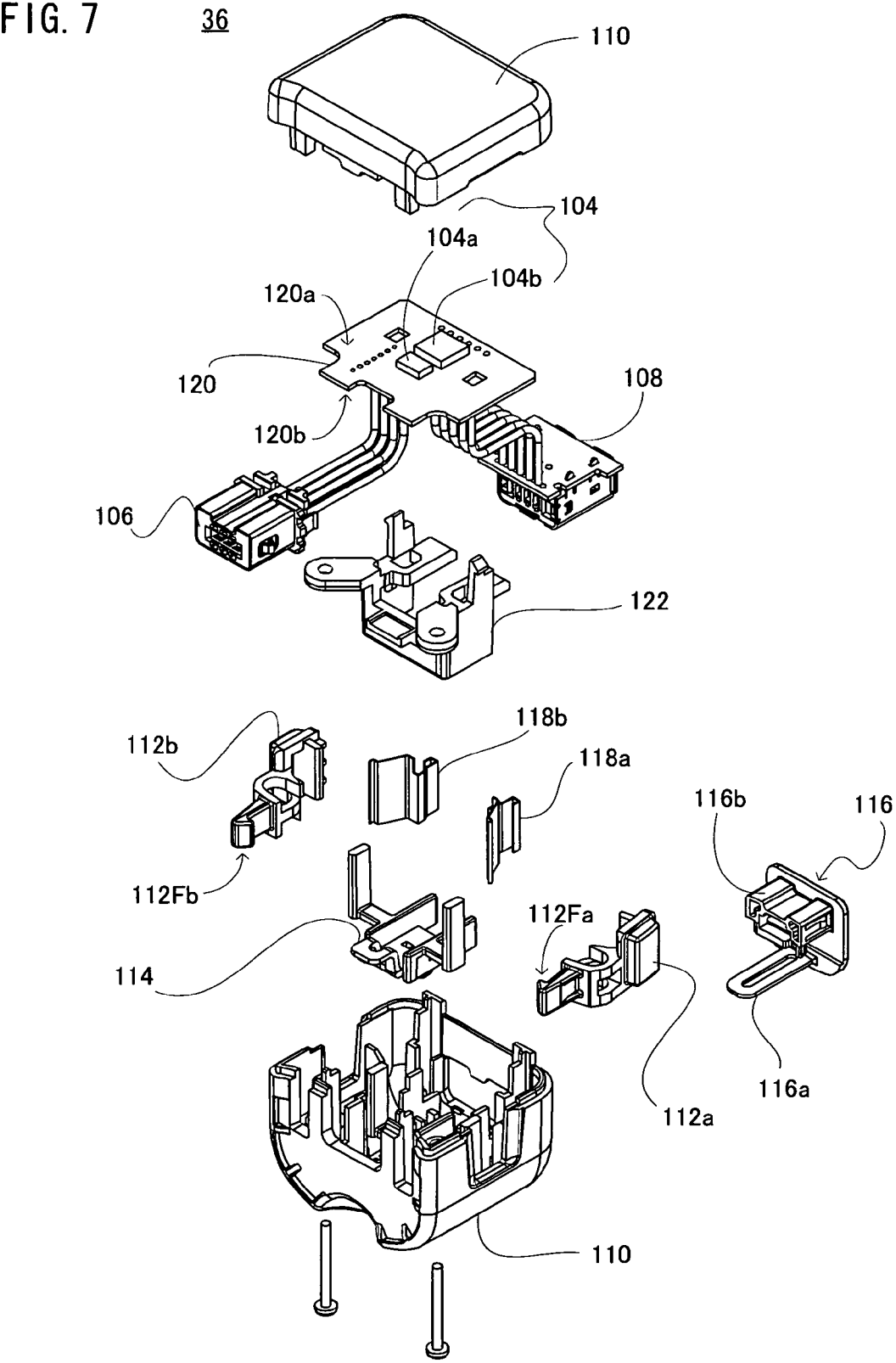
FIG. 7 is an illustrative view showing a structure of the gyro sensor unit.

FIG. 7 shows one example of a structure of the gyro sensor unit 100. The gyro sensor unit 100 also has a gyro substrate 120 and a support member 122 in addition to the above-described housing 110, connectors 106 and 108, release buttons 112a and 112b, hooks 112Fa and 112Fb, lock switch 114, connector cover 116 and locking springs 118a and 118b. The gyro substrate 120 is connected to each of the connectors 106 and 108 by a signal wire, and the support member 122 supports the gyro substrate 120 and the connectors 106 and 108.

The gyro substrate 120 is provided with a gyro sensor 104. The gyro sensor 104 is made up of two chips including one-axis gyro sensor 104a and two-axis gyro sensor 104b. The gyro sensor 104a is for detecting an angular velocity (angular velocity about the Y axis) relating to a yaw angle, and the gyro sensor 104b is for detecting two angular velocities (angular velocity about the Z axis and angular velocity about the X axis) relating to a roll angle and a pitch angle. The gyro sensors 104a and 104b are horizontally provided and arranged in parallel on a top surface 120a of the gyro substrate 120.

Here, the arrangement of the gyro sensors 104a and 104b are not restricted to that shown in FIG. 7. In another embodiment, the gyro sensor 104a is horizontally provided on one of the top surface 120a and the bottom surface 120b of the gyro substrate 120, and the gyro sensor 104b is horizontally provided on the other of the top surface 120a and the bottom surface 120b of the gyro substrate 120 so as to be opposed to the gyro sensor 104a with the gyro substrate 120 therebetween. In another embodiment, the gyro sensor 104a is vertically provided on one of the top surface 120a and the bottom surface 120b of the gyro substrate 120, and the gyro sensor 104b is horizontally provided on the other of the top surface 120a and the bottom surface 120b of the gyro substrate 120.

Furthermore, the gyro sensor 104 is not restricted to be made up of two chips, may be made up of three one-axis gyro sensors (three chips), or may be made up of one three-axis gyro sensor (one chip). In either case, a position and a direction of each of the chips are decided so as to properly detect the above-described three angular velocities. In addition, under certain circumstances, the gyro sensor 104 may be made up of one two-axis gyro sensor, or may be mad up of one or two one-axis gyro sensor.

It should be noted that the shapes of the first controller 34 shown in FIG. 2, the second controller 36 shown in FIG. 3 and the gyro sensor unit 100 shown in FIG. 6, and the shape, the number and the setting position of the button (switch or stick, etc.) are merely one example, and may be changed to another shape, number and setting position, etc. as necessary.

Here, the sensor is a gyro sensor (angular velocity sensor) in a preferred embodiment, but may be other motion sensors, such as an acceleration sensor, a velocity sensor, a displacement sensor, a rotation angle sensor, etc. Other than the motion sensors, there are a slant sensor, an image sensor, an optical sensor, a pressure sensor, a magnetic sensor, a temperature sensor, etc., and in a case that either sensor is added, an operation by utilizing an object to be detected of the sensor is made possible. In a case that either sensor is utilized, the operating device can be added with a sensor while utilizing another device conventionally connected to the operating device as it is.

In addition, the power source of the controller 14 is applied by a battery (not illustrated) which is replaceably accommodated in the first controller 34. The power is supplied to the second controller 36 via the connector 40 and the cable 38. If the gyro sensor unit 100 is connected to the first controller 34, the power is supplied to the gyro sensor unit 100 via the connectors 42 and 106. Alternatively, if the second controller 36 is connected to the gyro sensor unit 100, a part of the power supplied from the first controller 34 to the gyro sensor unit 100 is also applied to the second controller 36 via the connector 108, the connector 40 and the cable 38.

Figure 10:
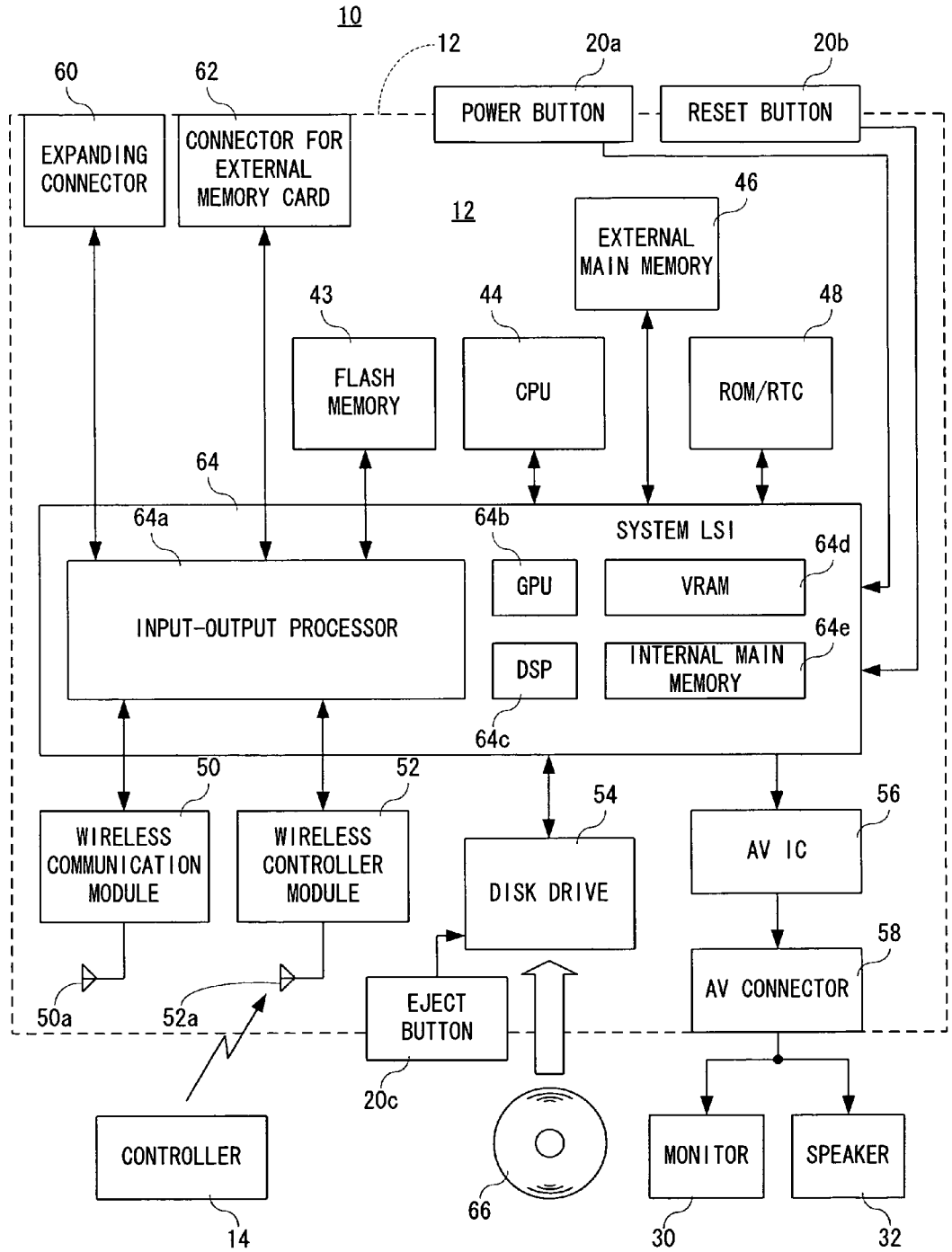
FIG. 10 is a block diagram showing an electric configuration of FIG. 1 embodiment.

FIG. 10 shows an electric configuration of the game system 10. Although illustration is omitted, respective components within the housing 16 are mounted on the printed-circuit board. As shown in FIG. 10, the game apparatus 12 is provided with a CPU 44 functioning as a game processor. Furthermore, the CPU 44 is also connected with a system LSI 64. The system LSI 64 is connected with an external main memory 46, a ROM/RTC 48, a disk drive 54 and an AV IC 56.

The external main memory 46 is utilized as a work area and a buffer area of the CPU 44 by storing programs such as a game program, etc. and various data. The ROM/RTC 48, which is a so-called boot ROM, is incorporated with a program for activating the game apparatus 12, and is provided with a time circuit for counting a time. The disk drive 54 reads program, texture data, etc. from the optical disk 66, and writes them in an internal main memory 64e described later or the external main memory 46 under the control of the CPU 44.

The system LSI 64 is provided with an input-output processor 64a, a GPU (Graphics Processor Unit) 64b, a DSP (Digital Signal Processor) 64c, a VRAM 64d and an internal main memory 64e, and these are connected with one another by internal buses although illustration is omitted.

The input-output processor (I/O processor) 64a executes transmission and reception of data and executes download of the data.

The GPU 64b is made up of a part of a drawing means, and receives a graphics command (construction command) from the CPU 44 to generate game image data according to the command. Additionally, the CPU 44 applies an image generating program required for generating game image data to the GPU 64b in addition to the graphics command.

Although illustration is omitted, the GPU 64b is connected with the VRAM 64d as described above. The GPU 64b accesses the VRAM 64d to acquire data (image data: data such as polygon data, texture data, etc.) required to execute the construction command. Here, the CPU 44 writes image data required for drawing to the VRAM 64d via the GPU 64b. The GPU 64b accesses the VRAM 64d to create game image data for drawing.

In this embodiment, a case that the GPU 64b generates game image data is explained, but in a case of executing an arbitrary application except for the game application, the GPU 64b generates image data as to the arbitrary application.

Furthermore, the DSP 64c functions as an audio processor, and generates audio data corresponding to a sound, a voice, music, or the like to be output from the speaker 32 by means of the sound data and the sound wave (tone) data stored in the internal main memory 64e and the external main memory 46.

The game image data and audio data which are generated as described above are read by the AV IC 56, and output to the monitor 30 and the speaker 32 via the AV connector 58. Accordingly, a game screen is displayed on the monitor 30, and a sound (music) necessary for the game is output from the speaker 32.

Furthermore, the input-output processor 64a is connected with a flash memory 43, a wireless communication module 50 and a wireless controller module 52, and is also connected with an expanding connector 60 and a connector for external memory card 62. The wireless communication module 50 is connected with an antenna 50a, and the wireless controller module 52 is connected with an antenna 52a.

The input-output processor 64a can communicate with other game apparatuses and various servers to be connected to a network (not shown) via a wireless communication module 50. It should be noted that it is possible to directly communicate with another game apparatus without going through the network. The input-output processor 64a periodically accesses the flash memory 43 to detect the presence or absence of data (referred to as data to be transmitted) being required to be transmitted to a network, and transmits it to the network via the wireless communication module 50 and the antenna 50a in a case that data to be transmitted is present. Furthermore, the input-output processor 64a receives data (referred to as received data) transmitted from another game apparatuses via the network, the antenna 50a and the wireless communication module 50, and stores the received data in the flash memory 43. In a case that the received data does not satisfy a constant condition, the received data is abandoned as it is. In addition, the input-output processor 64a receives data (download data) downloaded from the download server (not illustrated) via the network, the antenna 50a and the wireless communication module 50, and stores the download data in the flash memory 43.

Furthermore, the input-output processor 64a receives input data transmitted from the controller 14 via the antenna 52a and the wireless controller module 52, and (temporarily) stores it in the buffer area of the internal main memory 64e or the external main memory 46. The input data is erased from the buffer area after being utilized in the processing by the CPU 44 (game processing, for example).

In this embodiment, as described above, the wireless controller module 52 makes communications with the controller 14 in accordance with Bluetooth standards. This makes it possible for the game apparatus 12 to not only fetch data from the controller 14 but also to transmit a predetermined command to the controller 14 to thereby control a motion of the controller 14 from the game apparatus 12.

In addition, the input-output processor 64a is connected with the expanding connector 60 and the connector for external memory card 62. The expanding connector 60 is a connector for interfaces, such as USB, SCSI, etc., and can be connected with medium such as an external storage and peripheral devices such as another controller different form the controller 14. Furthermore, the expanding connector 60 is connected with a cable LAN adapter, and can utilize the cable LAN in place of the wireless communication module 50. The connector for external memory card 62 can be connected with an external storage like a memory card. Thus, the input-output processor 64a, for example, accesses the external storage via the expanding connector 60 and the connector for external memory card 62 to store and read the data.

Although a detailed description is omitted, as shown in FIG. 10, the game apparatus 12 (housing 16) is furnished with the power button 20a, the reset button 20b, and the eject button 20c. The power button 20a is connected to the system LSI 64. When the power button 20a is turned on, the system LSI 64 sets a mode of a normal energized state in which the respective components of the game apparatus 12 are supplied with power through an AC adapter not shown.

The reset button 20b is also connected with the system LSI 64. When the reset button 20b is pushed, the system LSI 64 restarts the activation program of the game apparatus 12. The eject button 20c is connected to the disk drive 54. When the eject button 20c is pushed, the optical disk 66 is removed from the disk drive 54.

Figure 11:
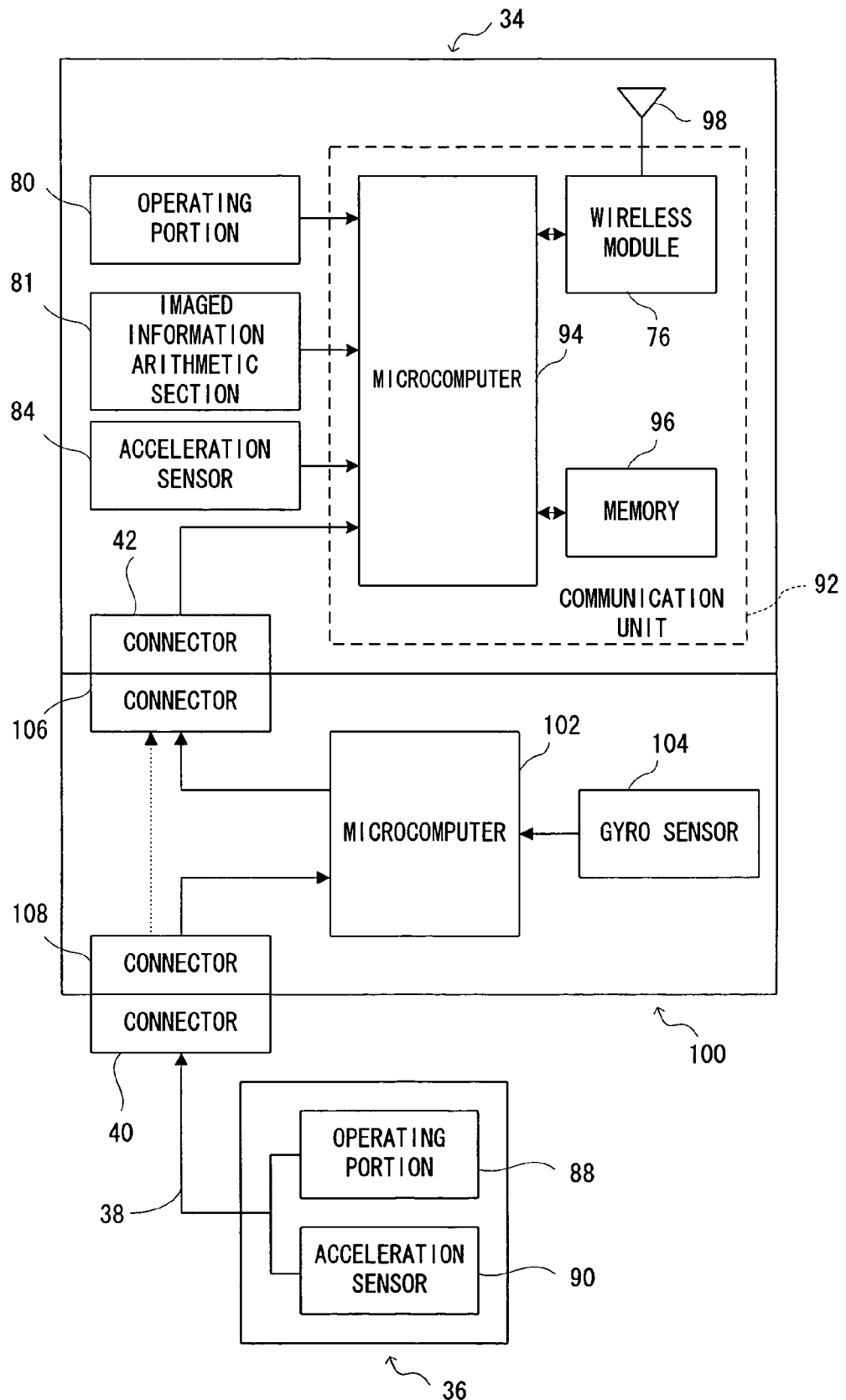
FIG. 11 is a block diagram showing an electric configuration of all the controllers applied to FIG. 1 embodiment.

FIG. 11 shows one example of an electric configuration of the controller 14 as a whole when the first controller 34 and the second controller 36 are connected via the gyro sensor unit 100.

The first controller 34 incorporates a communication unit 92, and the communication unit 92 is connected with an operating portion 80, the imaged information arithmetic section 81, the acceleration sensor 84, and the connector 42. The operating portion 80 indicates the above-described operation buttons or operation switches 80a-80i. When the operating portion 80 is operated, data indicating the operation is applied to the communication unit 92. From the imaged information arithmetic section 81, data indicating the position coordinates of the markers 22a and 22b within the object scene is output to the communication unit 92. The data indicating the acceleration detected by the acceleration sensor 84 is also output to the communication unit 92. The acceleration sensor 84 has a sampling period being in the order of 200 frames/seconds at the maximum, for example.

The connector 42 is connected with the connector 106 of the gyro sensor unit. The gyro sensor unit 100 includes the microcomputer 102 and the gyro sensor 104 inside thereof. The gyro sensor 104 shows the above-described gyro sensors 104a and 104b, and has a sampling period similar to the acceleration sensor 84, for example. The microcomputer 102 outputs to the communication unit 92 data indicating the angular velocity detected by the gyro sensor 104 via the connector 106 and the connector 42.

The connector 108 of the gyro sensor unit 100 is connected with the connector 40 of the cable 38 extending from the second controller 36. The connector 40 is connected with an operating portion 88 and an acceleration sensor 90 of the second controller 36. The operating portion 88 shows the above-described stick 88a and operation buttons 88b, 88c. When the operating portion 88 is operated, data indicating the operation is applied to the microcomputer 102 of the gyro sensor unit 100 via the cable 38, the connector 40 and the connector 108. The microcomputer 102 outputs the data to the communication unit 92 via the connector 106 and the connector 42. The acceleration sensor 90 also has a sampling period similar to the acceleration sensor 84, and the data indicating the acceleration thus detected is also output to the communication unit 92 by the microcomputer 102.

Here, each output to the above-described communication unit 92 is executed at a cycle of 1/200 seconds. Accordingly, during arbitrary 1/200 seconds, operation data from the operating portion 80, position coordinate data from the imaged information arithmetic section 81, acceleration data from the acceleration sensor 84, angular velocity data from the gyro sensor 104, operation data from the operating portion 88, and acceleration data from the acceleration sensor 90 are output to the communication unit 92 once for each of them.

Figure 12:
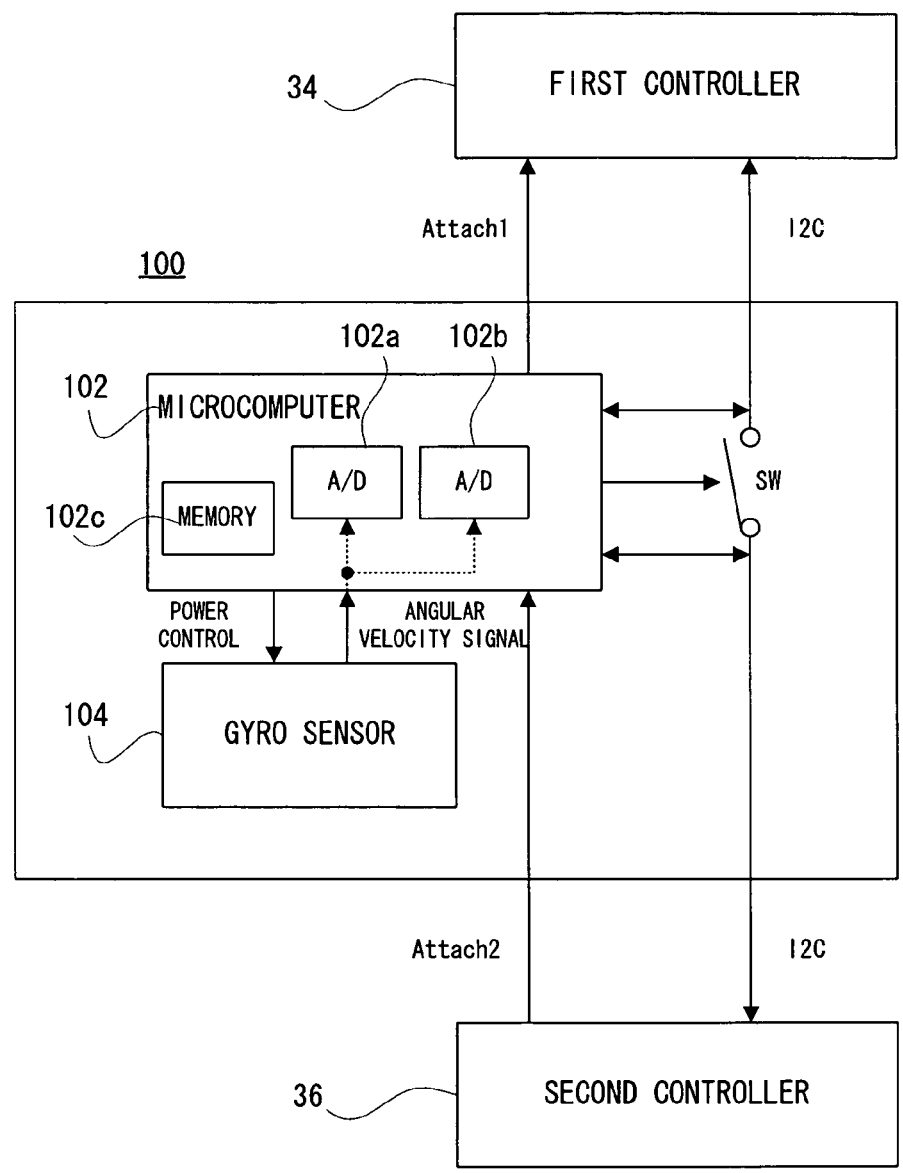
FIG. 12 is a block diagram showing an electric configuration of a gyro sensor unit placed between the first controller and the second controller in the controllers shown in FIG. 11.

FIG. 12 shows an important part of the gyro sensor unit 100 of the entire configuration shown in FIG. 11. Each of the above-described connector 42, connector 106, connector 108 and connector 40 is a connector of six pins, for example, in which an Attach pin for controlling a variable "Attach" indicating a connected state between the connectors is included. The Attach is changed between "Low" indicating that the connectors are not connected, and "High" indicating that the connectors are connected. In what follows, the Attach between the connector 42 and the connector 106, that is, between the first controller 34 and the gyro sensor unit 100 is called "Attach1", and the Attach between the connector 108 and the connector 40, that is, the gyro sensor unit 100 and the second controller 36 is called "Attach2".

Even if the first controller 34 is attached with the gyro sensor unit 100, if the application is a gyro-incompatible type, and the gyro sensor unit 100 is not connected with the second controller 36, the Attach1 is controlled to be "Low" such that the gyro sensor unit 100 is not viewed from the gyro-incompatible application by the microcomputer 102 of the gyro sensor unit 100 (standby mode: see FIG. 14). In the standby mode, a power supply to the gyro sensor 104 is stopped to make the gyro function inactive. The microcomputer 102 exclusively performs a mode selection based on the Attach2 and a power source management based on an instruction from the gyro-compatible application.

The other two pins out of the aforementioned six pins are assigned I2C buses, and the gyro sensor unit 100 further includes a bus switch SW for connecting/isolating the I2C bus on the side of the first controller 34 and the I2C bus on the side of the second controller 36. The bus switch SW is turned on by the microcomputer 102 when the gyro-incompatible application is executed in a state that the second controller 36 is connected to the first controller 34 via the gyro sensor unit 100. Thereafter, the data from the second controller 36 is output to the communication unit 92 through the I2C bus without passing through the microcomputer 102 (bypass mode: see FIG. 14). Thus, the microcomputer 102 merely performs a mode selection and a power source management similar to the standby mode, which reduces electric power consumption. Furthermore, the gyro-incompatible application can be executed even with the gyro sensor unit 100 attached. When the bus switch SW is turned off, the bus is connected to the microcomputer 102, and the data to be output to the first controller 34 is controlled by the microcomputer 102.

The bus switch SW is turned on even in the standby mode. This makes it possible for the gyro-compatible type application to confirm whether or not the first controller 34 is attached with the gyro sensor unit 100 with reference to a special address of the I2C bus even if the Attach1 is controlled to "Low" as described above.

It should be noted that the gyro sensor unit 100 is prepared with four modes including a "gyro" mode and a "gyro & second controller" mode in addition to the above-described "standby" and "bypass" modes. In the former two modes, the bus switch SW is turned off.

The microcomputer 102 of the gyro sensor unit 100 includes two kinds of A/D conversion circuits 102a and 102b, and the angular velocity signals about the three axes output from the gyro sensor 104 are applied to each of the A/D conversion circuits 102a and 102b. In the A/D conversion circuit 102a, A/D converting processing of a high angular velocity mode for regarding all the detection range by the gyro sensor 104 (±360°/sec) as a target, for example, is executed, and in the A/D conversion circuit 102b, A/D converting processing of a low angular velocity mode for regarding a part of the detection range by the gyro sensor 104 (±90/sec, for example) as a target is executed. The microcomputer 102 outputs any one of the two kinds results of the A/D transformation as angular velocity data.

More specifically, when two kinds of angular velocity data corresponding to at a certain time are output from the A/D conversion circuits 102a and 102b, the microcomputer 102 first determines whether or not with respect to the angular velocity data of the low angular velocity mode, the value A falls within the range of a first threshold value Th1 to a second threshold value Th2(>Th1), that is, a condition "Th1≦A≦T2" is satisfied, for each of the axis, that is, the yaw axis, the roll axis, and the pitch axis. Next, on the basis of these three determination results, any one of the low angular velocity mode and the high angular velocity mode is selected. For example, with respect to each of the three determination results, if "YES", the low angular velocity mode is selected for each axis, and if "NO", the high angular velocity mode is selected for each axis. Then, the angular velocity data according to the mode selected for each axis is output along with the mode information indicating the selected mode. That is, by changing accuracy of the data depending on the angular velocity, it is possible to output data with high accuracy at low speeds even if the data amount is equal.

FIG. 13 shows a data format handled by the gyro sensor unit 100. FIG. 13(A) shows a data format for gyro sensor unit 100, and FIG. 13(B) shows a data format for second controller 36. The data for gyro sensor unit 100 includes yaw angular velocity data, roll angular velocity data and pitch angular velocity data, and yaw angular velocity mode information, roll angular velocity mode information and pitch angular velocity mode information, and second controller connection information and gyro/second controller identifying information.

The yaw angular velocity data, the roll angular velocity data and the pitch angular velocity data, each of which is 14 bits data, for example, are respectively obtained, through an A/D conversion, from a yaw angular velocity signal, a roll angular velocity signal and a pitch angular velocity signal which are output from the gyro sensor 104. Each of the yaw angular velocity mode information, the roll angular velocity mode information and the pitch angular velocity mode information is information of one bit indicating a corresponding mode of each of the angular velocity data, and changed between "0" corresponding to the high angular velocity mode and "1" corresponding to the low angular velocity mode.

The second controller connection information is information of one bit to indicate whether or not the second controller 36 is connected to the connector 108, and is changed between "0" indicating a non-connection and "1" indicating a connection. The gyro/second controller identifying information is information of one bit to identify whether the data is data output from the gyro sensor unit 100 or the data output from the second controller 36, and is changed between "1" indicating that this is from the gyro sensor unit 100 and "0" indicating that this is from the second controller 36.

On the other hand, the data for second controller 36 includes X stick operation data and Z stick operation data respectively indicating a stick operation in the right and left direction (X-axis direction) and a stick operation in the forward and reward direction (Z-axis direction), and X acceleration data, Y acceleration data and Z acceleration data respectively indicating an acceleration in the X-axis direction, an acceleration in the Y-axis direction and an acceleration in the Z-axis direction, and button operation data, second controller connection information, and gyro/second controller identifying information.

The gyro sensor unit 100 alternately outputs data for gyro according to the format shown in FIG. 13(A) and data for second controller according to the format shown in FIG. 13(B) to the communication unit 92 at a cycle of 1/200 seconds, for example. Accordingly, the data in the one of the format is consequently output at a cycle of 1/100 seconds, but this is much shorter than the cycle of 1/60 seconds as a general processing period for game processing, etc., and therefore, even if the data is alternately output, both of the data can be used for one frame at the same time in the game processing.

The communication unit 92 includes a microcomputer (micon) 94, a memory 96, a wireless module 76, and an antenna 98. The micon 94 transmits the obtained data to the game apparatus 12 and receives data from the game apparatus 12 by controlling the wireless module 76 while using the memory 96 as a memory area (working area and buffer area) in processing.

The data output to the communication unit 92 from the gyro sensor unit 100 is temporarily stored in the memory 96 through the microcomputer 94. The data output to the communication unit 92 from the operating portion 80, the imaged information arithmetic section 81 and the acceleration sensor 84 within the first controller 34 are also temporarily stored in the memory 96. The microcomputer 94 outputs data stored in the memory 96 to the wireless module 76 as controller data when a transmission timing to the game apparatus 12 has come. The controller data includes the data for first controller in addition to the data for gyro and/or the data for second controller shown in FIG. 13(A) and FIG. 13(B). The data for first controller includes X acceleration data, Y acceleration data and Z acceleration data based on an output from the acceleration sensor 84, position coordinate data based on an output from the imaged information arithmetic section 81, and button operation data based on an output from the operating portion 80.

The wireless module 76 modulates a carrier at a predetermined frequency by the controller data, and emits its weak radio wave signal from the antenna 98 by using a short-range wireless communication technique, such as Bluetooth (trademarks). Namely, the controller data is modulated to the weak radio wave signal by the wireless module 76 and transmitted from the first controller 34. The weak radio wave signal is received by the wireless controller module 52 of the game apparatus 12. The weak radio wave thus received is subjected to demodulating and decoding processing, so that the game apparatus 12 can obtain the controller data. The CPU 44 of the game apparatus 12 performs the game processing on the basis of the controller data obtained from the controller 14. Here, the wireless communication between the first controller 34 and the game apparatus 12 may be executed according to another standard, such as a wireless LAN, etc.

Figure 18:
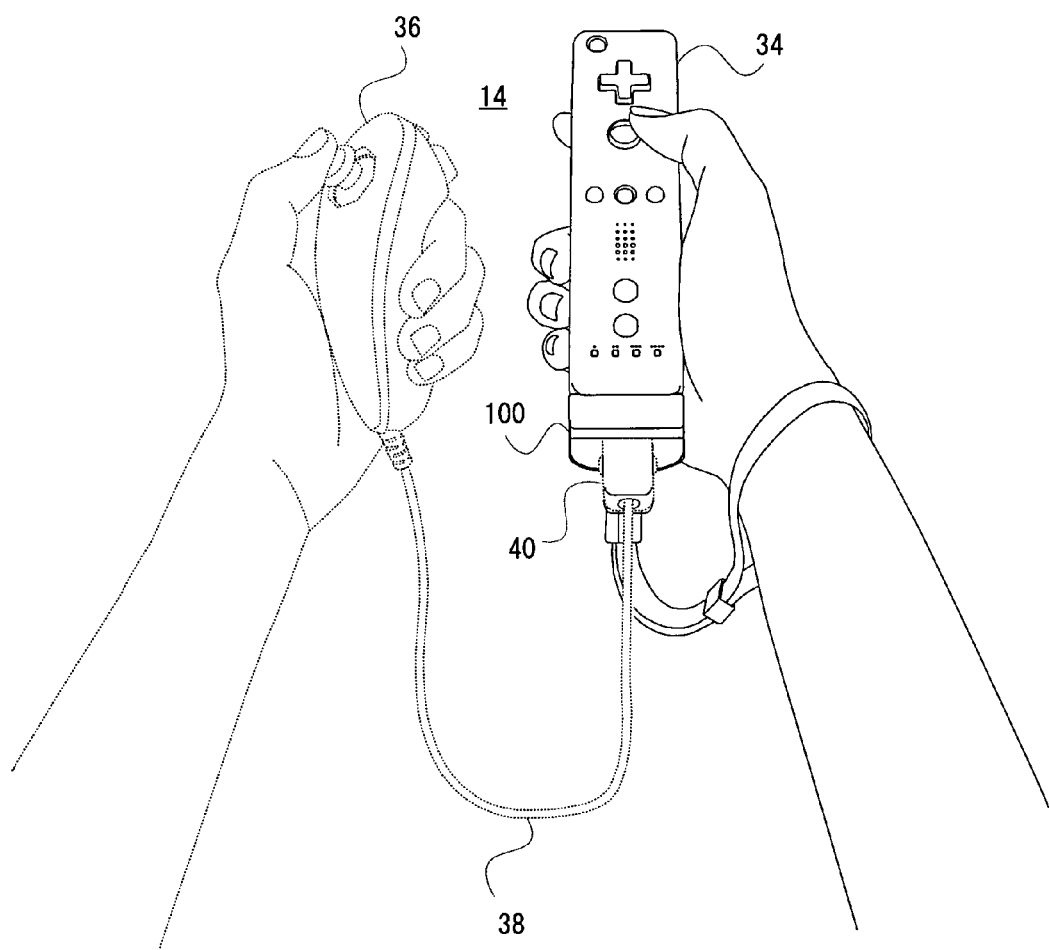
FIG. 18 is an illustrative view showing a manner in which a player operates the controller.

In this game system 10, a user can make an input to an application like a game, or the like by moving the controller 14 itself other than a button operation. In playing the game, for example, the user holds the first controller 34 (specifically, holding portion 78a of the housing 78: FIG. 2) with the right hand and the second controller 36 with the left hand as shown in FIG. 18. As described above, the first controller 34 is incorporated with the acceleration sensor 84 for detecting accelerations in the three-axis directions, and the second controller 36 is also incorporated with the similar acceleration sensor 90. When the first controller 34 and the second controller 36 are moved by the player, acceleration values in the three-axis directions indicating the motions of the respective controllers are detected by the acceleration sensor 84 and the acceleration sensor 90. In a case that the gyro sensor unit 100 is attached to the first controller 34, angular velocity values about the three-axes indicating the motion of the first controller 34 itself is further detected.

These detected values are transmitted to the game apparatus 12 in a form of the aforementioned controller data. In the game apparatus 12 (FIG. 10), the controller data from the controller 14 is received by the input-output processor 64a via the antenna 52a and the wireless controller module 52, and the received controller data is written to a buffer area of the internal main memory 64e or the external main memory 46. The CPU 44 reads the controller data stored in the buffer area of the internal main memory 64e or the external main memory 46, and restores the detected value, that is, the values of the acceleration and/or the angular velocity detected by the controller 14 from the controller data.

Here, the angular velocity data has two modes of the high angular velocity mode and low angular velocity mode, and therefore, the two kinds of angular velocity restoring algorithms corresponding to the two modes are prepared. In restoring the angular velocity value from the angular velocity data, the angular velocity restoring algorithm corresponding to the mode of the angular velocity data is selected on the basis of the angular velocity mode information.

The CPU 44 may execute processing for calculating a velocity of the controller 14 from the restored acceleration in parallel with such a restoring processing. In parallel therewith, a travel distance or a position of the controller 14 can be evaluated from the calculated velocity. On the other hand, from the restored angular velocity, a rotation angle of the controller 14 is evaluated. Here, the initial value (constant of integration) when the accelerations are accumulated to calculate the velocity, and the angular velocities are accumulated to calculate the rotation angle can be calculated from the position coordinate data from the imaged information arithmetic section 81, for example. The position coordinate data can also be used for correcting the errors accumulated due to the integration.

The game processing is executed on the basis of the variables thus evaluated, such as the acceleration, the velocity, the travel distance, the angular velocity, the rotation angle, etc. Accordingly, all of the processing described above need not to be executed, and the variables necessary for the game processing may be calculated as required. It should be noted that the angular velocity and the rotation angle can also be calculated from the acceleration in principle, but this requires a complex routine for the game program, which also imposes a heavy processing load on the CPU 44. By utilizing the gyro sensor unit 100, a development of the program is made easy, and the processing load on the CPU 44 is reduced.

By the way, some games may be a game for single controller of utilizing only the first controller 34 and other games may be a game for two controllers of utilizing the first controller 34 and the second controller 36, and the respective games are classified into a gyro-compatible type and a gyro-incompatible type. The first controller 34 being a main controller is required for playing all the games. Furthermore, the second controller 36 being an expanding controller is connected to the first controller 34 via the gyro sensor unit 100 or directly when the game for two controllers is played, and is removed in general when the game for single controller is played.

On the other hand, the gyro sensor unit 100 being an expanding sensor or an expanding controller is not required when the gyro-incompatible game is played, but it is not required to take the trouble to be removed. Thus, the gyro sensor unit 100 remains to be attached to the first controller 34, and dealt as a single unit with the first controller 34, in general. The second controller 36 is detachable similar to a case that the gyro sensor unit 100 is not involved except that the connection destination of the connector 40 is changed from the connector 42 to the connector 108.

FIG. 14 shows a table in which a control by the microcomputer 102 of the gyro sensor unit 100 is described for each mode. The mode prepared for the gyro sensor unit 100 is four kinds of the aforementioned "standby", "bypass", "gyro" and "gyro and second controller", and the target to be controlled by the microcomputer 102 covers six items of "gyro function", "gyro power source", "bus switch", "expanding connector", "Attach1" and "I2C address".

The gyro function is in a stopped state (No Active) in each of the standby mode and the bypass mode, but is in a started-up state (Active) in each of the gyro mode and the gyro and second controller mode. A power supply to the gyro power source, that is, the gyro sensor 104 is stopped (OFF) in each of the standby mode and the bypass mode, and executed (ON) in each of the gyro mode and the gyro and second controller mode. The bus switch SW is connected (Connect) in each of the standby mode and the bypass mode, and isolated (Disconnect) in each of the gyro mode and the gyro and second controller mode.

The expanding connector, that is, the connector 108 is in a started-up state in each of the bypass mode and the gyro and second controller mode, and in a stopped state in each of the standby mode and the gyro mode. The Attach1 is controlled to "Low" indicating an unconnected state in the standby mode, and to "High" indicating a connected state in each of the bypass mode, the gyro mode and the gyro and second controller mode. In relation to the I2C address, a special address is noted only in each of the standby mode and the bypass mode.

The mode switching is performed shown in a manner in FIG. 15. FIG. 15(A) shows switching processing in a case that the application is gyro-compatible, and FIG. 15(B) shows switching processing in a case that the application is gyro-incompatible. In common to FIG. 15(A) and FIG. 15(B), that is, irrespective of whether the gyro-compatible application or the gyro-incompatible application, the gyro sensor unit 100 starts up in response to the gyro sensor unit 100 itself being connected to the first controller 34, and enters in a standby mode being an initial mode. Here, when the second controller 36 is connected to the gyro sensor unit 100, the standby mode shifts to the bypass mode, and when the second controller 36 is then removed therefrom, the bypass mode is restored to the standby mode.

Here, the gyro-compatible application issues a call and a reset to the gyro sensor unit 100 in order to fetch angular velocity data as required. As described above, in this embodiment, it is possible to control the controller from the game machine by the communication, and therefore, by the application, it is possible to control the gyro sensor unit 100. Thus, as shown in FIG. 15(A), when receiving a call from the application in the standby mode, the gyro sensor unit 100 shifts to the gyro mode, and when receiving a reset from the application in the gyro mode, the gyro sensor unit 100 is restored to the standby mode. The gyro sensor unit 100 shifts to the gyro and second controller mode when being connected with the second controller 36 in the gyro mode, and is restored to the gyro mode when being disconnected with the second controller 36 in the gyro and second controller mode. The gyro sensor unit 100 further shifts to the bypass mode when receiving a reset from the application in the gyro and second controller mode, and is restored to the gyro and second controller mode when receiving a call from the application in the bypass mode.

On the other hand, the gyro-incompatible application does not have a function of performing a call and a reset with respect to the gyro sensor unit 100. Thus, when the gyro-incompatible application is executed, the mode of the gyro sensor unit 100 is merely switched between the standby mode and the bypass mode as shown in FIG. 15(B).

Figure 16:
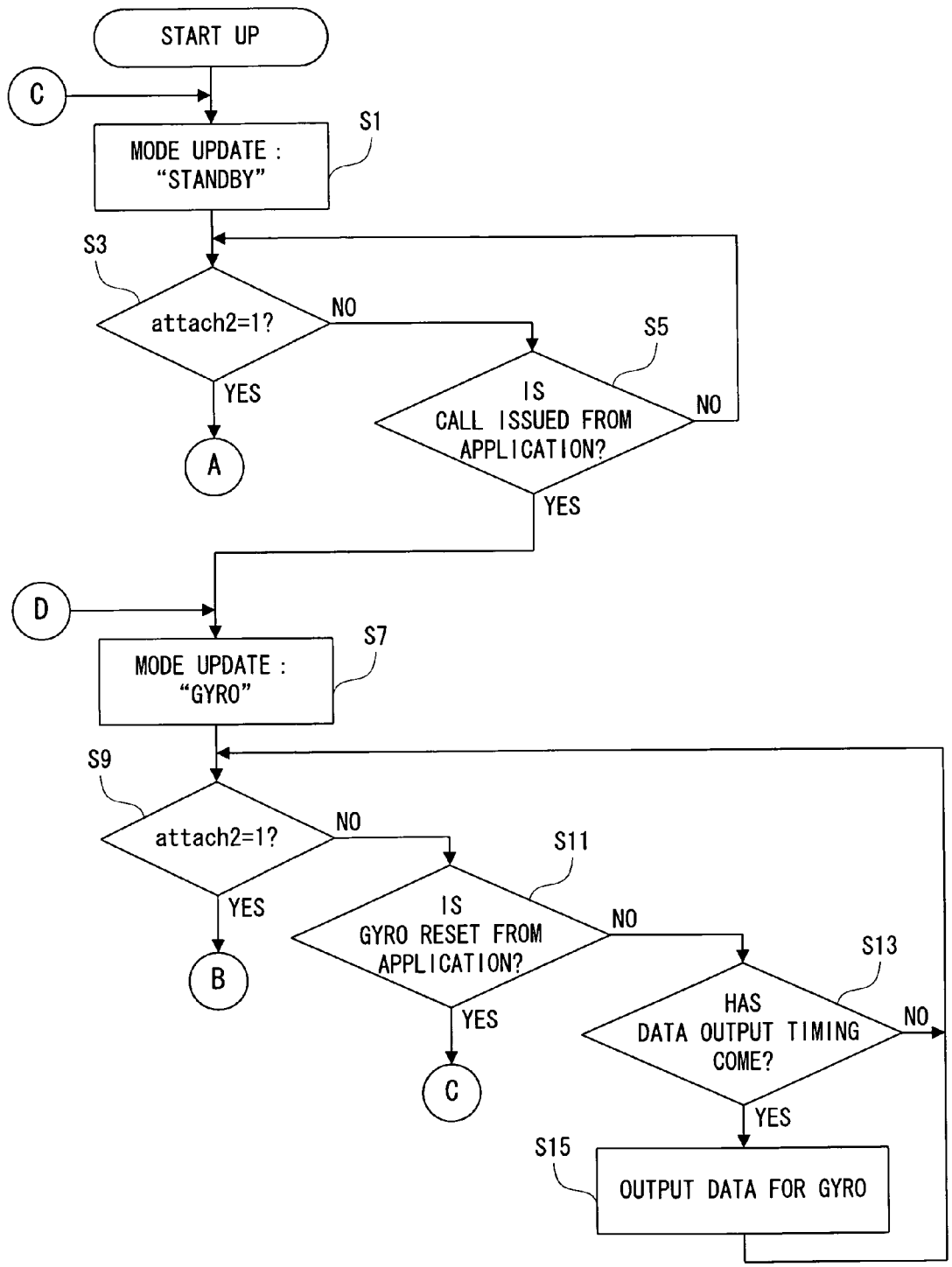
FIG. 16 is a flowchart showing a part of an operation of the microcomputer of the gyro sensor unit.
Figure 17:
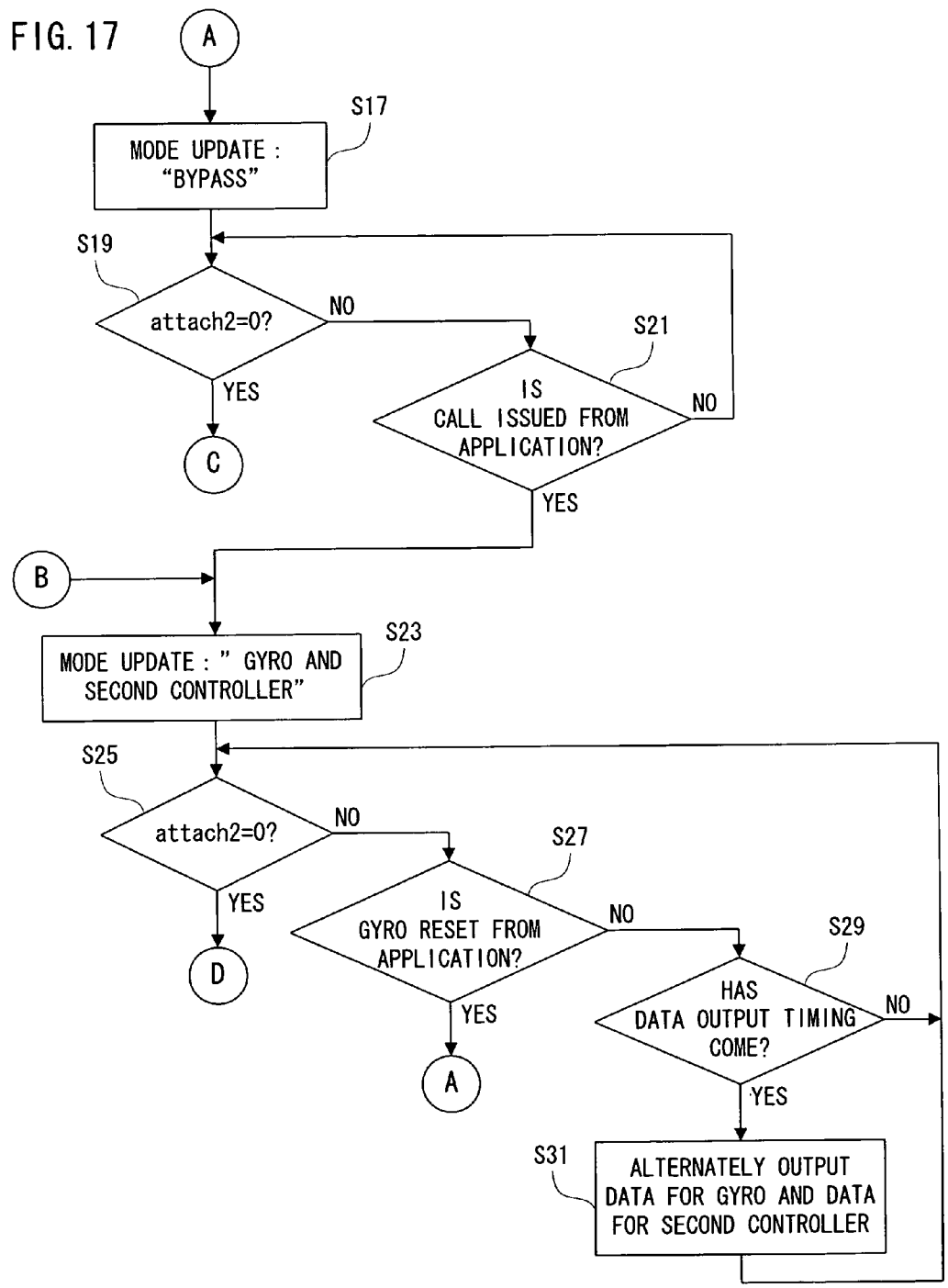
FIG. 17 is a flowchart showing another part of the operation of the microcomputer of the gyro sensor unit.

The mode switching by the gyro sensor unit 100 is realized by execution of the processing shown in the flowchart shown in FIG. 16 and FIG. 17 by the microcomputer 102 with reference to the table shown in FIG. 14. Here, the program corresponding to the flowchart and the table shown in FIG. 14 are stored in the nonvolatile memory 102c (FIG. 12).

When the user attaches the gyro sensor unit 100 to the first controller 34, the microcomputer 102 is supplied with power from the first controller 34 so as to be started and executes processing shown in the flowchart shown in FIG. 16 and FIG. 17. The processing is executed over a period until the gyro sensor unit 100 is removed from the first controller 34.

Referring to FIG. 16, after completion of the startup, the microcomputer 102 first performs a mode update to the standby mode in a step S1. More specifically, the microcomputer 102 stops the gyro function, stops the power supply to the gyro sensor 104, connects the bus switch SW, stops the connector 108, controls the Attach1 to "Low", and starts to note the special address of the I2C bus, according to the definition of "standby" described in the table (FIG. 14) within the memory 102c. Thus, when the gyro sensor unit 100 shifts to the standby mode, the process enters a loop of steps S3 and S5.

That is, the microcomputer 102 determines whether or not the Attach2 is "1" in the step S3, and if "NO" here, it is further determined whether or not a call is issued from the application in the step S5. If "NO" here, the process returns to the step S3. In this mode here, the gyro is not used, so that no operation data is output to the first controller 34, or only the fact that there is no operation data is output. When in response to the second controller 36 being connected to the first controller 34 via the gyro sensor unit 100, the Attach2 changes from "0" to "1", the determination result in the step S3 becomes "YES", and the process shifts to a step S17. On the other hand, when a call is issued from the application to the gyro sensor unit 100, the determination result in the step S5 becomes "YES", and the process shifts to a step S7.

In the step S7, a mode update to the gyro mode is performed. More specifically, the microcomputer 102 starts up the gyro function, starts power supply to the gyro sensor, disconnects the bus switch SW, stops the connector 108, and controls the Attach1 to "High", according to the definition of "gyro" described in the table (FIG. 14). When the gyro sensor unit 100 thus shifts to the gyro mode, the process enters the loop of steps S9-S13.

Whether or not the Attach2 is "1", whether or not a reset is issued from the application, and whether or not the current time corresponds to the data output timing are determined in the step S9, the step S11, and the step S13, respectively. When the Attach2 changes from "0" to "1", the determination result in the step S9 is "YES", and the process shifts to a step S23.

When a reset is issued from the application to the gyro sensor 100, the determination result in the step S11 becomes "YES", and the process returns to the step S1. When a preset time elapses from the previous data output, the determination result in the step S13 becomes "YES", the process shifts to a step S15. In the step S15, the microcomputer 102 outputs the data for gyro (FIG. 13(A)) to the side of the first controller 34. After completion of the outputting, the process returns to the loop of the steps S9-S13.

Referring to FIG. 17, in the step S17, a mode update to the bypass mode is performed. More specifically, the microcomputer 102 stops the power supply to the gyro sensor 104, stops the gyro function, connects the bus switch SW, starts up the connector 108, and then makes the Attach1 "High", according to the definition of "bypass" described in the table (FIG. 14) within the memory 102c. Noting the special address by the I2C bus is stopped. When the gyro sensor unit 100 thus shifts to the bypass mode, the process enters the loop of steps S19 and S21.

Whether or not the Attach2 is "0" and whether or not a call is issued from the application are determined in the step S19 and step S21, respectively. When the Attach2 is changed from "1" to "0", the determination result in the step S19 becomes "YES", and the process returns to the step S1. When a call is issued from the application to the gyro sensor unit 100, the determination result in the step S21 becomes "YES", and the process shifts to a step S23. In the bypass mode here, the data for second controller (FIG. 13(B)) is directly output to the first controller 34 from the second controller 36, and therefore, the microcomputer 102 outputs no data as a result.

In the step S23, the mode is updated to the gyro and second controller mode. More specifically, the microcomputer 102 starts a power supply to the gyro sensor 104, starts up the gyro function, disconnects the bus switch SW, starts up the connector 108, and controls the Attach1 to "High", according to the definition of "gyro & second controller" described in the table (FIG. 14) within the memory 102c. Noting the special address by the I2C bus is stopped. When the gyro sensor unit 100 thus shifts to the gyro and second controller mode, the process enters the loop of steps S25-S29.

In the step S25, it is determined whether or not the Attach2 is "0", in the step S27, it is determined whether or not a reset is issued from the application, and in the step S29, it is determined whether or not the current time corresponds to a data output timing. When the Attach2 changes from "1" to "0", the determination result in the step S25 becomes "YES", and the process returns to the step S7. When a reset is issued from the application to the gyro sensor unit 100, the determination result in the step S27 becomes "YES", and the process returns to the step S17. When a preset time elapses from the previous data output, the determination result in the step S29 becomes "YES", and the process shifts to a step S31. In the step S31, the microcomputer 102 alternately outputs the data for gyro (FIG. 13(A)) and the data for second controller (FIG. 13(B)) to the side of first controller 34. After the output, the process returns to the loop of the steps S25-S29.

As understood from the above description, in this embodiment, the gyro sensor unit 100 is provided with the housing 110, the connectors 106 and 108 and the gyro sensor 104. The connector 106 has a first shape physically and electrically connectable to the connector 42 provided to the first controller 34. Thus, by connecting the connector 106 to the connector 42 of the first controller 34, the gyro sensor unit 100 is physically and electrically connected to the first controller 34 via the two connectors 42 and 106, so that the gyro sensor unit 100 can be used with the first controller 34 as a single unit. That is, the first controller 34 is eventually added with the gyro sensor 104.

On the other hand, the connector 108 has a second shape which allows a connector having the first shape to be connected. Thus, a connector of another device conventionally connected to the connector 42, such as the connector 40 of the second controller 36, for example, can also be connected to the connector 108. Accordingly, if the connector 40 is connected to the connector 108 with the connector 42 connected with connector 106, the second controller 36 is eventually connected to the first controller 34 via the gyro sensor unit 100.

Thus, the gyro sensor 104 can be added to the first controller 34 while another device such as a second controller 36, etc. conventionally connected to the first controller 34 is utilized as it is. The gyro sensor as a means to detect an angular velocity is positioned in the vicinity of the wrist, so that the angular velocity is often detected near the rotating shaft, which makes it easy to detect the angular velocity. The acceleration sensor is positioned in front of the wrist, which makes it easy to detect a centrifugal force. That is, when seeing the operating device as a whole, the acceleration sensor is positioned forward and the gyro sensor is positioned backward, which enables an operation system capable of precisely detecting a motion of the hand of the player to be provided. Adding the gyro sensor 104 for detecting the angular velocity eliminates the need of incorporating a routine for calculating an angular velocity or a rotation angle in the individual game program, which lights the load on the developer. Furthermore, the processing load on the CPU 44 of the game apparatus 12 is also reduced.

Furthermore, in this embodiment, the first controller 34 has the housing 78 taking a long shape having a thickness to be held with one hand. On the top surface of the housing 78, a first operating portion (operation button 80a, 80d, etc.) is provided at a position operable by the thumb of the one hand, and on the bottom surface of the housing 78, a second operating portion (operation button 80h) is provided at a position operable by the index finger of the one hand in a state that the thumb of the one hand is put on the first operating portion. On the housing 78, a holding portion 78a is formed at a position holdable with the palm and the other fingers of the one hand in a state where the thumb the index finger are put on the first operating portion and the second operating portion, respectively. Accordingly, the first operating portion and the second operating portion are on the front side of the housing 78, and the holding portion 78a is on the rear side of the housing 78. Thus, when holding the housing 78 with the one hand, the user puts the thumb on the first operating portion of the top surface, puts the index finger on the second operating portion of the bottom surface, and holds the holding portion 78a with the palm and the other fingers.

Additionally, the first controller 34 further has the acceleration sensor 84, and the housing 78 further has the imaged information arithmetic section 81 at an end opposed to the holding portion 78a, and the connector 42 at the end of the holding portion 78a. By the way, the gyro sensor unit 100 has the housing 110, the connector 106 connectable with the connector 42, and the gyro sensor 104. Accordingly, the user connects the connector 106 to the connector 42 to thereby connect the gyro sensor unit 100 to the first controller 34. The gyro sensor unit 100 thus connected to the first controller 34 is positioned on the rear end of the first controller 34, that is, in the vicinity of the wrist of the hand holding the first controller 34 (FIG. 18). The acceleration value output from the acceleration sensor 84 and the angular velocity value output from the gyro sensor 104 respectively indicate accelerations of the first controller 34 and angular velocities of the gyro sensor unit 100.

By thus placing the gyro sensor unit 100 on the rear side of the first controller 34, the position of the barycenter of the incorporated controller is move backward toward the position of the palm. The increase in the centrifugal force due to the gyro sensor unit 100 being connected to the first controller 34 is made less than that when the gyro sensor unit 100 is placed at the front end of the first controller 34. Furthermore, since the centrifugal force worked on the gyro sensor unit 100 acts so as to push against the first controller 34, the gyro sensor unit 100 and the first controller 34 are firmly secured. In addition, the gyro sensor 104 positions in the vicinity of the wrist, so that the angular velocity is often detected near the rotating shaft, which makes the detection accuracy of the angular velocity high. On the other hand, the acceleration sensor 84 is positioned in front of the wrist, which makes it easy to detect the acceleration due to the rotation.

Furthermore, in this embodiment, the first controller 34 is further provided with a strap attaching portion (through hole 82c) to which the strap 24 is attached. The gyro sensor unit 100 is further provided with the lid 116 with which the connector 108 is covered. The lid 116 is captive from the gyro sensor unit 100 even in a state that it is removed from the connector 108. The second controller 36 is further provided with the hook 144 near the connector 40, and the hook 144 hangs and retains the strap 24 attached to the first controller 34 in a case that the second controller 36 is connected to the first controller 34 while the hook 144 hangs the lid 116 captive from the gyro sensor unit 100 in a case that the second controller 36 is connected to the gyro sensor unit 100.

Accordingly, it is possible for the player to wear the strap 24 on the wrist of the hand holding the first controller 34. Furthermore, in a case that the gyro sensor unit 100 is added between the first controller 34 and the second controller 36, the lid 116 which is detached from the connector 108 and captive from the gyro sensor unit 100 is hung up on the hook 144 on which the strap 24 is conventionally hung up, which makes difficult to remove the connector 40 from the connector 108. Thus, while the second controller 36 conventionally connected to the first controller 34 is used as it is, it is possible to add the gyro sensor unit 100 to the first controller 34.

Figure 19:
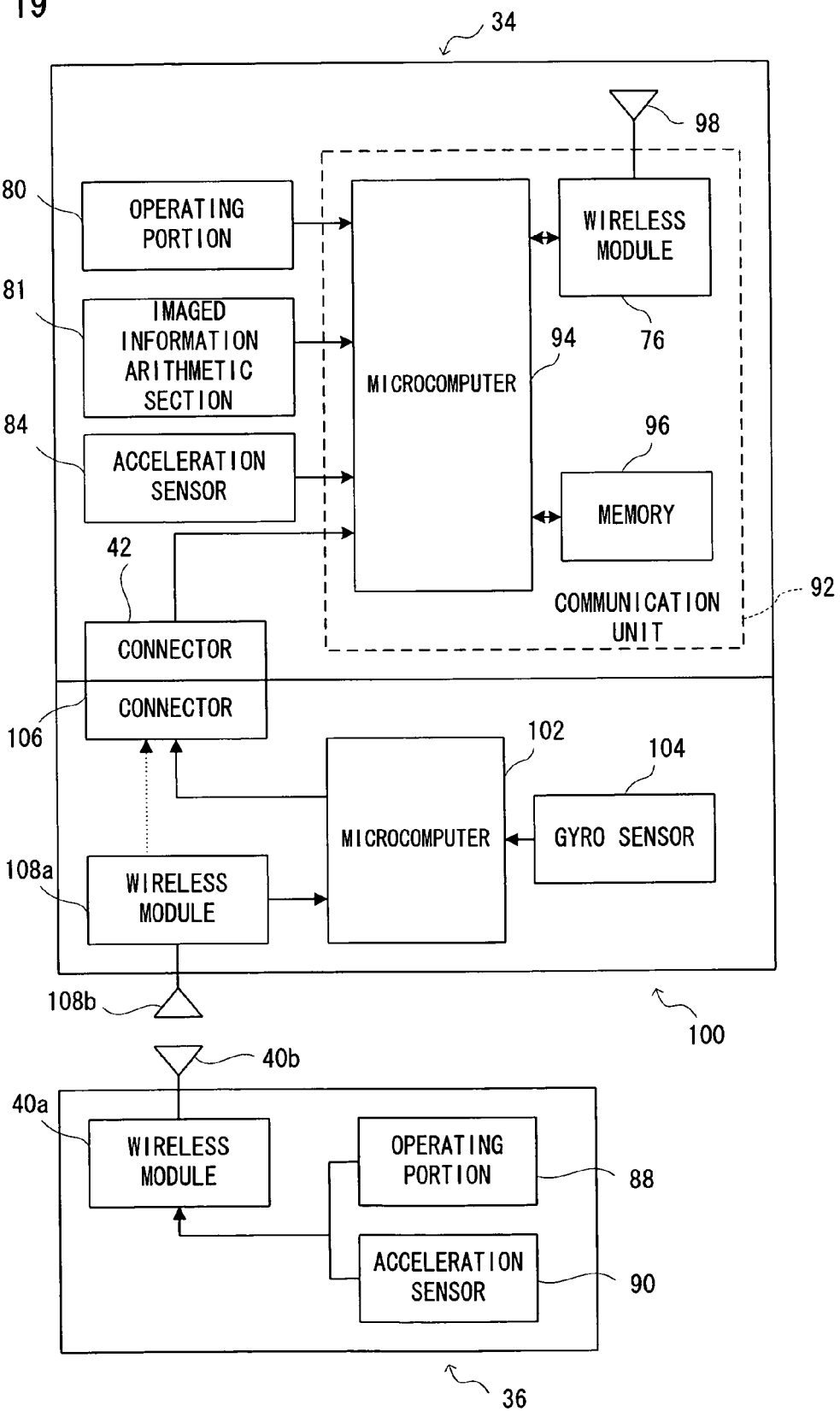
FIG. 19 is a block diagram showing an electric configuration of all controllers applied to another embodiment.

Additionally, in this embodiment, although the gyro sensor unit 100 and the second controller 36 are connected with the cable 38, they may be connected by a wireless communication. FIG. 19 shows one example of this case. In FIG. 19 embodiment, the gyro sensor unit 100 is provided with a wireless module 108a and an antenna 108b in place of the aforementioned connector 108, and the second controller 36 is provided with a wireless module 40a and an antenna 40b in place of the aforementioned connector 40. The wireless modules 40a and 108a transmit and receive data via the antennas 40b and 108b by a short distance radio communication technique, such as Bluetooth (registered trademark), a wireless LAN, an infrared ray communication, etc. In FIG. 19 embodiment, by using the first controller 34 as it was, and adding the gyro sensor unit 100 and the second controller 36 by means of radio, it is possible to completely separately move the second controller 36 and the first controller 34, capable of performing an operation with a high degree of freedom. Furthermore, the gyro sensor unit 100 has not only a function of adding a gyro, but also a function of working as an adapter capable of connecting various expanding controllers by radio.

In the above, the explanation is made by using the game system 10 as one example, but the invention can be applied to a computer system which performs processing according to the application of the game, etc. on the basis of the motion of the operating device itself.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An operation system comprising:
a first operating device including
  a first housing taking a long shape and having a thickness capable of being held by a hand,
  a first operating portion provided on a top surface of said first housing, said first operating portion being provided at a position that said first operating portion can be operated by a thumb of said hand,
  a second operating portion provided on a bottom surface of said first housing, said second operating portion being provided at a position that said second operating portion can be operated by an index finger of the hand in a state where the thumb of the hand is put on said first operating portion,
  a holding portion formed on said first housing, said holding portion being provided at a position that said holding portion can be held by a palm and other finger(s) of said hand in a state where said thumb and said index finger of said hand are respectively put on said first operating portion and said second operating portion,
  a first acceleration sensor,
  an imaging means provided at an end opposed to said holding portion of said first housing, and
  a first connector provided at an end of said holding portion of said first housing; and
a second operating device including at least a second housing, a second connector connectable to said first connector, and a three-axis gyro sensor, wherein an operation is performed by connecting said second operating device to said first operating device,
wherein said second operating device further includes a third connector, further comprising
a third operating device including a fourth connector connectable with said third connector, a third housing, a second acceleration sensor, and a stick capable of inputting a direction, wherein
an operation is performed by connecting said third operating device to said second operating device.

2. An operation system comprising:
a first operating device including
  a first housing taking a long shape and having a thickness capable of being held by a hand,
  a first operating portion provided on a top surface of said first housing, said first operating portion being provided at a position that said first operating portion can be operated by a thumb of said hand,
  a second operating portion provided on a bottom surface of said first housing, said second operating portion being provided at a position that said second operating portion can be operated by an index finger of the hand in a state where the thumb of the hand is put on said first operating portion,
  a holding portion formed on said first housing, said holding portion being provided at a position that said holding portion can be held by a palm and other finger(s) of said hand in a state where said thumb and said index finger of said hand are respectively put on said first operating portion and said second operating portion,
  a first acceleration sensor,
  an imaging means provided at an end opposed to said holding portion of said first housing, and
  a first connector provided at an end of said holding portion of said first housing; and
a second operating device including at least a second housing, a second connector connectable to said first connector, and a three-axis gyro sensor, wherein an operation is performed by connecting said second operating device to said first operating device,
further comprising
a third operating device including a third housing, a second acceleration sensor, and a stick capable of performing a direction input, wherein
an operation is performed by connecting said third operating device to said second operating device via a wireless communication.

3. An operation system according to claim 1, wherein said third operating device includes said second acceleration sensor and said stick inside said third housing, and said third housing and said fourth connector are connected via a bendable cable.

4. An operation system according to claim 1, wherein said fourth connector has a shape connectable with said first connector in place of said third connector.

5. An expanding operating device utilized in an operation system in claim 2 as said second operating device, including said second connector, said second housing, and said gyro sensor.

6. An operation system according to claim 2 wherein said second operating device further includes a output data controlling means for performing a control of data to be output to said first operating device via said second connector, and
said first operating device further includes a communicating means for transmitting at least data on the basis of outputs from said first operating portion, said second operating portion, said first acceleration sensor and said imaging means, and data output from said second operating device via said second connector.

7. An operation system comprising:
a first operating device including
  a first housing taking a long shape and having a thickness capable of being held by a hand,
  a first operating portion provided on a top surface of said first housing, said first operating portion being provided at a position that said first operating portion can be operated by a thumb of said hand,
  a second operating portion provided on a bottom surface of said first housing, said second operating portion being provided at a position that said second operating portion can be operated by an index finger of the hand in a state where the thumb of the hand is put on said first operating portion,
  a holding portion formed on said first housing, said holding portion being provided at a position that said holding portion can be held by a palm and other finger(s) of said hand in a state where said thumb and said index finger of said hand are respectively put on said first operating portion and said second operating portion,
  a first acceleration sensor,
  an imaging means provided at an end opposed to said holding portion of said first housing, and a first connector provided at an end of said holding portion of said first housing; and a second operating device including at least a second housing, a second connector connectable to said first connector, and a three-axis gyro sensor, wherein an operation is performed by connecting said second operating device to said first operating device, wherein said second operating device further includes a third connector, further comprising a third operating device including a fourth connector connectable to said third connector, a third housing, a second acceleration sensor, and a stick capable of inputting a direction, and connecting said third operating device to said second operating device to perform an operation, and said communicating means further transmits data output from said third operating device via said fourth connector.

8. An operation system according to claim 7, wherein said second operating device further includes a bus switch for directly connecting a line on a side of said third connector to a side of said second connector, and a bus switch controlling means for switching said bus switch between on and off, and the line on the side of said third connector is connected to the side of said second connector via said output data controlling means when said bus switch is turned off.

9. An operation system according to claim 8, further comprising a gyro sensor power managing means for switching a power supply to said gyro sensor between on and off, wherein said bus switch controlling means turns the connection of said bus switch on when the power source of said gyro sensor is turned off.

10. An operation system according to claim 9, wherein said second operating device further includes a connection detecting means for detecting whether or not said third operating device is connected to said third connector, and said output data controlling means alternately outputs first data input from said third operating device and second data based on the output from said gyro sensor to said first operating device when the connection of said bus switch is turned off, and said third operating device is connected to said third connector.

11. A controller arrangement comprising:

a housing dimensioned and structured to be capable of being grasped by a single human hand, said housing defining top and bottom surfaces and a front portion;

a first operating portion disposed on the top surface of said housing, said first operating portion being disposed at a position such that said first operating portion can be operated by a thumb of said hand when said hand grasps said housing, a second operating portion provided on the bottom surface of said housing, said second operating portion being provided at a position such that said second operating portion can be operated by an index finger of the hand in a state when the hand grasps said housing and the thumb of the hand contacts said first operating portion, a holding portion being formed on said housing, said holding portion being provided at a position such that said holding portion can be grasped by a palm and other finger(s) of said hand when said thumb and said index finger of said hand are respectively contacting said first operating portion and said second operating portion, an acceleration sensor disposed in the housing, a gyrosensor structured to move with the housing, the gyrosensor being configured in accordance with gyro sensor command signals and providing yaw, roll and pitch angular velocity data;

an infrared imaging device provided at the housing front portion, a radio receiver within the housing, the radio receiver receiving the gyro sensor command signals and communicating the gyro sensor command signals to the gyro sensor, and a first connector, wherein the first connector permits the controller arrangement to interoperate with a further device comprising at least a further housing and a second connector connectable to said first connector, said further device including an inertial sensor disposed within the further housing, wherein an operation can be performed by connecting said further operating device to the controller arrangement via the first and second connectors.

12. The controller arrangement of claim 11 wherein said bottom surface forms at least part of said holding portion.

13. The controller arrangement of claim 11 wherein the further device comprises a further handheld device connectable via a cable.

14. The controller arrangement of claim 11 wherein the further device comprises a module that mounts to the housing by mating the first and second connectors.

15. The controller arrangement of claim 14 wherein the gyrosensor is disposed in said module.

16. The controller arrangement of claim 11 wherein the first operating portion comprises a cross switch and the second operating portion comprises a trigger switch.

17. The controller arrangement of claim 11 wherein the acceleration sensor measures linear acceleration, the gyrosensor measures angular rate, and the imaging device produces coordinates based on infrared markers.

18. A handheld controller for use with a game application, comprising:

a housing dimensioned and structured to be grasped and held by the hand, said housing defining top and bottom surfaces and a front portion;

a first operating control disposed on the top surface of said housing, said first operating control being disposed at a position such that the thumb of said hand can operate said first operating control while said hand is grasping said housing, a second operating control provided on the bottom surface of said housing, said second operating portion being provided at a position such that an index finger of the hand can operate the second operating control when the hand grasps said housing and the thumb of the hand operates said first operating control, a radio transceiver disposed within the housing;

an acceleration sensor disposed within the housing that measures linear acceleration of the housing, a gyrosensor that measures yaw, roll and pitch angular velocity data of the housing;

a controller coupled to the gyrosensor and the radio receiver that selectively resets the gyrosensor in response to signals the radio receiver receives from the game application; and an electrical connector structured to pluggably interoperate the controller with a further handheld device mateable with said connector.

19. The controller as in claim 18 wherein said further handheld device includes an additional inertial sensor that interoperates with the game application via the radio transceiver, the radio transceiver wirelessly sending acceleration signals measured by the acceleration sensor and angular rate signals measured by the gyrosensor to the game application.

20. The controller as in claim 18 wherein the further handheld device includes a further connector, and the first-mentioned connector includes mechanical pawls that mechanically secure the further connector.

21. The handheld controller of claim 18 wherein the further device comprises a further handheld device connected to the connector via a cable.

22. The handheld controller of claim 18 wherein the further device comprises a module that mounts to the housing upon mating with the connector.

23. The handheld controller of claim 21 wherein the gyrosensor is disposed in said module.

24. The handheld controller of claim 18 wherein the first operating control comprises a cross switch and the second operating control comprises a trigger switch.

25. The handheld controller of claim 18 wherein the imaging device produces coordinates based on infrared markers.

26. The handheld controller of claim 18 further including an infrared imaging device provided at the housing front end.

27. The handheld controller of claim 18 further including a holding portion provided by the housing bottom surface at a position on the housing such that a palm and other finger(s) of said hand can grasp said holding portion while said thumb and said index finger of said hand are respectively operating said first operating control and said second operating control.

28. A handheld controller for use with a game application, comprising:
- a housing dimensioned and structured to be grasped and held by the hand, said housing defining top and bottom surfaces and a front portion;
- a first operating control disposed on the top surface of said housing, said first operating control being disposed at a position such that the thumb of said hand can operate said first operating control while said hand is grasping said housing,
- a second operating control provided on the bottom surface of said housing, said second operating portion being provided at a position such that an index finger of the hand can operate the second operating control when the hand grasps said housing and the thumb of the hand operates said first operating control,
- an acceleration sensor that measures linear acceleration,
- a gyrosensor that measures yaw, roll and pitch angular velocity data;
- a radio transceiver disposed within the housing that wirelessly reports said measured linear acceleration and said measured yaw, roll and pitch angular velocity data;
- a controller coupled to the gyrosensor and the radio receiver, said controller selectively stopping, starting and/or resetting the gyrosensor in response to commands the radio receiver receives from the game application; and
- an electrical connector structured to pluggably interoperate the controller with a further handheld device mateable with said connector.

* * * * *